United States Patent [19]

Asai

[11] Patent Number: 5,428,459
[45] Date of Patent: Jun. 27, 1995

[54] FACSIMILE APPARATUS FOR MINIMIZING PRINTING OF WHITE DATA AT END OF PAGE

[75] Inventor: Kazunobu Asai, Nagoya, Japan

[73] Assignee: Brother Kogyo Kabushiki Kaisha, Nagoya, Japan

[21] Appl. No.: 263,201

[22] Filed: Jun. 21, 1994

[30] Foreign Application Priority Data

Aug. 10, 1993 [JP] Japan .................................. 5-219013

[51] Int. Cl.⁶ ........................ H04N 1/38; H04N 1/387; H04N 1/393
[52] U.S. Cl. .................................. 358/449; 358/451; 358/453; 358/468
[58] Field of Search ............... 358/434, 435, 436, 437, 358/438, 439, 404, 443, 444, 449, 451, 452, 453, 468

[56] References Cited

U.S. PATENT DOCUMENTS

| 4,631,596 | 12/1986 | Yaguchi | 358/453 |
| 4,731,658 | 3/1988 | Koseki | 358/451 |
| 4,805,135 | 2/1989 | Ochi et al. | 358/453 |
| 5,057,937 | 10/1991 | Muramatsu et al. | 358/451 |

Primary Examiner—Scott A. Rogers
Attorney, Agent, or Firm—Oliff & Berridge

[57] ABSTRACT

A facsimile apparatus for printing received image information on a sheet of print paper of a certain size determines whether each line of image information within the effective print range consists of only white pixels, and if the page length of image information is longer than the paper length and, at the same time, if lines of the excessive portion are judged to be consecutive white lines, the received image information exclusive of the excessive portion is printed in real-size on a sheet of print paper, or otherwise if the excessive lines are not only white lines, the whole received image information is printed in real-size on two sheets of print paper, thereby avoiding unnecessary down-sized printing and divisional printing.

14 Claims, 18 Drawing Sheets

TEXT

READOUT IMAGE INFORMATION

READING RANGE
PRINT RANGE

OUTGOING IMAGE INFORMATION

PRINT RANGE
DELETED

FACSIMILE APPARATUS FOR MINIMIZING PRINTING OF WHITE DATA AT END OF PAGE

BACKGROUND OF THE INVENTION

1. Field of the Invention

The invention relates to a facsimile unit operative to read the image of a text and send the image information to another facsimile unit, and also operative to receive image information from another facsimile unit and print the image on print paper.

2. Description of the Prior Art

Conventionally, when a facsimile unit prints image information that is sent from another facsimile unit, it preliminarily compares the page length in the secondary scanning direction of the image information with the length in the secondary scanning direction (paper feed direction) of a sheet of print paper. If the page length of image information is longer than the paper length, the receiving facsimile unit prints the one-page image information divisionally on two sheets of print paper or prints it in reduced-size on a sheet of print paper.

When a facsimile unit sends image information of a text to another facsimile unit, if the width in the primary scanning direction of the text matches the width in the primary scanning direction (the dimension perpendicular to the paper feed direction) of the print paper used by the receiving facsimile unit, the sending facsimile unit reads the prescribed range of the text irrespective of the print range of the receiving facsimile unit and, after the coding process, sends the image information to the receiving facsimile unit.

Among these conventional facsimile units, a certain facsimile unit is designed, with the intention of minimizing the communication time, such that it reads a text and if a line of image information consists of only white pixels (such a line will be referred to as "white line" hereinafter), it does not send the white line to the receiving facsimile unit. Another facsimile unit is designed, with the intention of minimizing the consumption of print paper, such that it receives image information and prints the image by skipping white lines so that the printed image has a reduced size in a secondary scanning direction. Still another facsimile unit is designed, with the intention of printing a long text image effectively without size reduction nor division, such that it receives image information and if the page length of the received image information is longer than the length of print paper and image information of the excessive portion is only white pixels, it prints the image by excluding the excessive portion.

The CCITT's Recommendation T.4 on facsimile apparatus states that the line read-width of reading means is to be 215 mm±1%), i.e., 1728 pixels, and the effective range of image information is to be 205 mm at a minimum. However, the text area that is guaranteed for reproduction stated in the Appendix of the CCITT's Recommendation T.4 is only 196.6 mm in a primary scanning direction, and accordingly, it connotes that part of received image information cannot actually be printed. On this account, in case the page length of received image information is longer than the length of print paper, and if line segments of blank image information exist outside of the guaranteed print range in the excessive portion, the facsimile unit cannot recognize these lines to be white lines. Consequently, the receiving facsimile unit carries out the unnecessary size reduction or division for the received image information, as shown in FIGS. 5A and 6A, printing too small, illegible characters or producing a divided useless blank page.

Another problem is that if image information is included within the read-guaranteed range but outside of the print-guaranteed range of a text page, or if a shadow of the text is created due to the flotation or skew during the text transportation, it is treated as significant image information, even though it cannot actually be printed, by the sending facsimile unit and sent to the receiving facsimile unit.

SUMMARY OF THE INVENTION

The invention is intended to overcome the foregoing prior art deficiencies, and its prime object is to provide a facsimile unit capable of avoiding the unnecessary size reduction or division process for the received image information through the detection of white lines based on the presence or absence of image information that can actually be printed.

In order to achieve the above objective, the facsimile unit based on the invention comprises a printing means for printing received image information on a sheet of print paper, white line discrimination means that examines each line of received image information and determines the line to be a white line if image information of the line included within a predetermined print range in the primary scanning direction of the printing means consists of only white pixel information, comparison means for comparing the page length in the secondary scanning direction of the receive image information with a prescribed length, and control means that controls the print operation in the case where the result of comparison of the comparison means reveals that the page length of the received image information is longer than the prescribed length and, at the same time, if the result of judgement of the white line discrimination means reveals that the excessive portion of the one-page image information is only white line data, to print the received image information exclusive of the excessive portion as one-page image information on a sheet of print paper.

Namely, the white-line discrimination means examines each line of received image information to determine whether image information within the print range in the primary scanning direction consists of only white pixel information, i.e., whether the line is a white line, and the comparison means compares the page length of received image information with the preset length. The control means operates depending on the judgement results, and if the received image information has a page length longer than the preset length and the excessive portion is white lines, it controls the printing means to print the received image information exclusive of the excessive portion as one-page image information on a sheet of print paper.

BRIEF DESCRIPTION OF THE DRAWINGS

Preferred embodiments of the invention will be described in detail with reference to the following figures, wherein.

DESCRIPTION OF THE PREFERRED EMBODIMENTS

Preferred embodiments of the invention will be explained with reference to the drawings.

Figure 1:
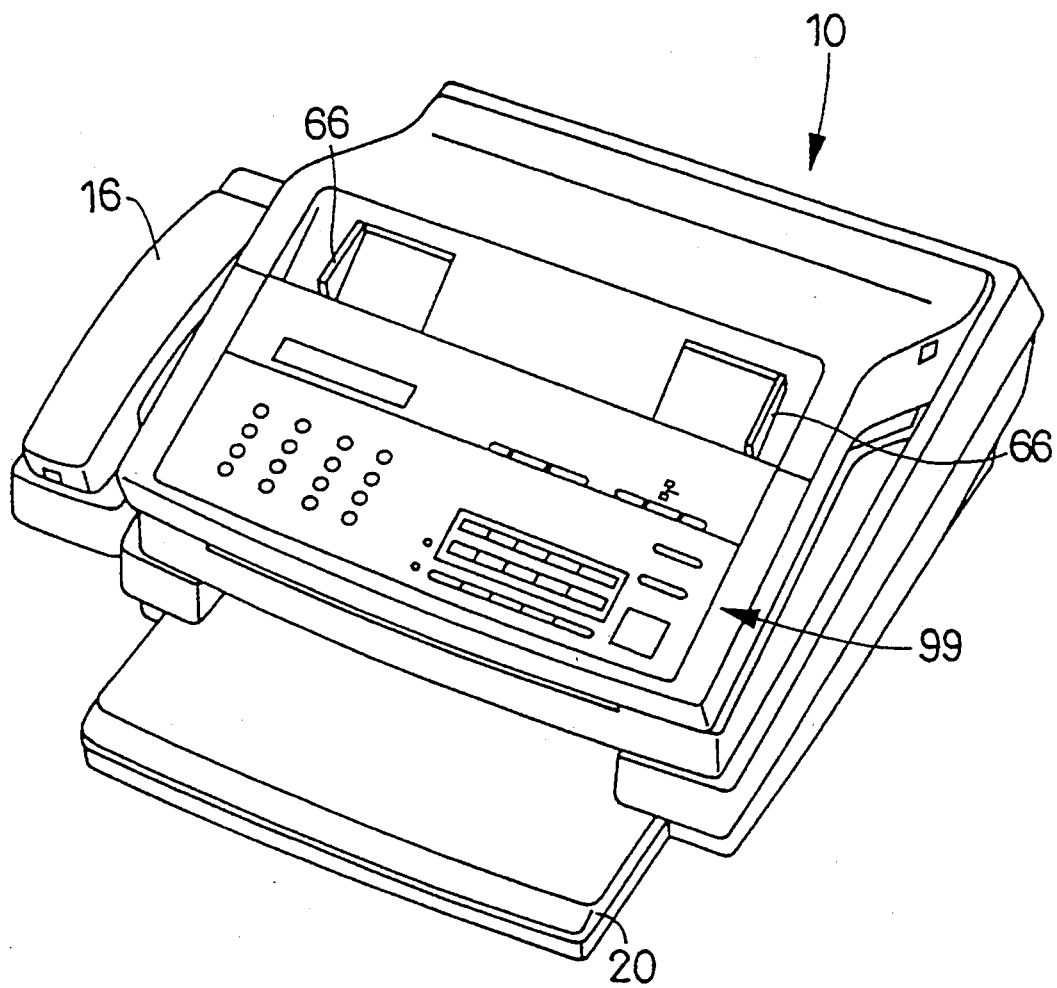
FIG. 1 is a perspective view of a facsimile unit based on the invention.
Figure 2:
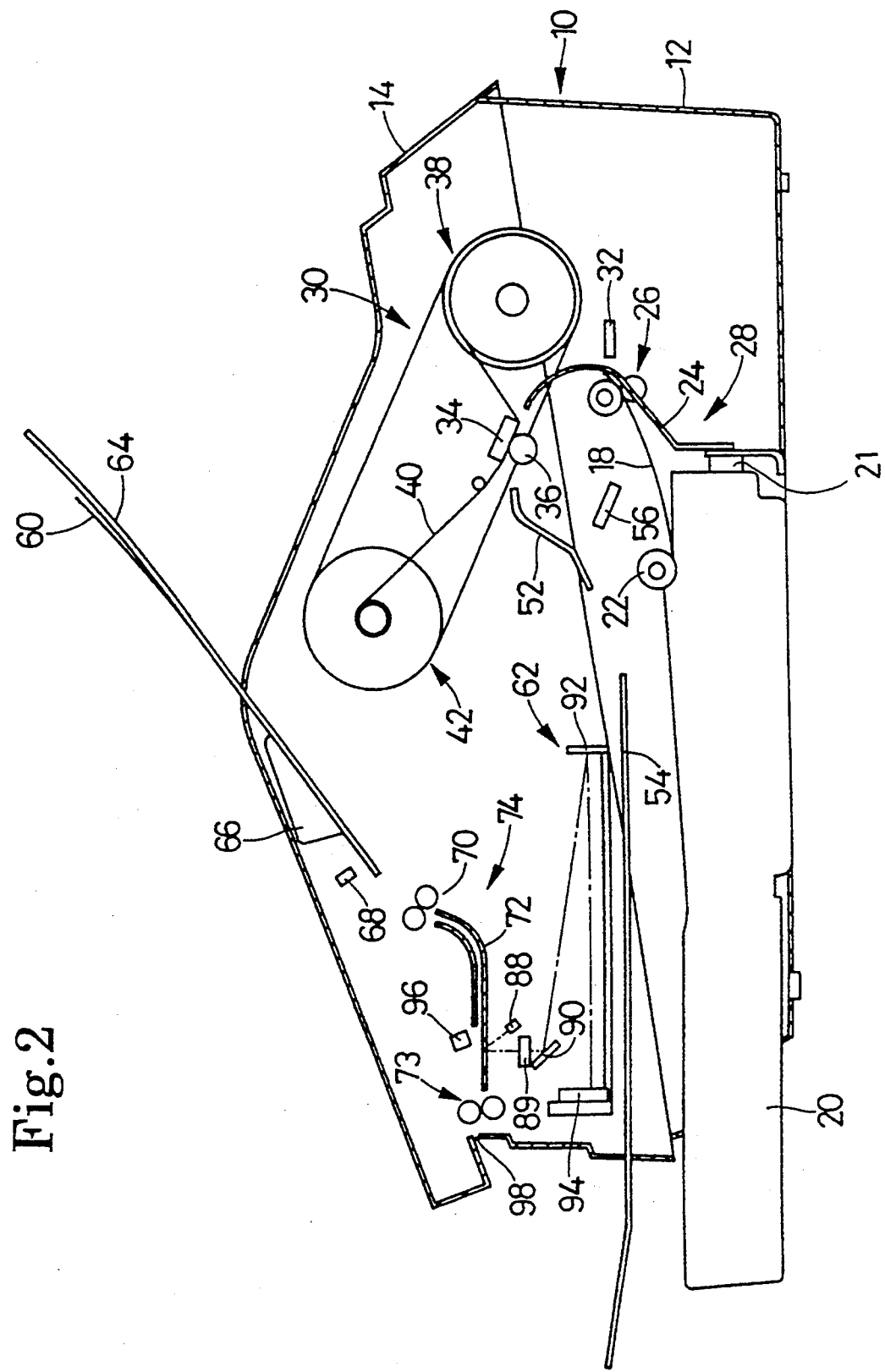
FIG. 2 is a side cross-sectional diagram of the facsimile unit.

FIGS. 1 and 2 show a facsimile unit in the first embodiment according to the invention. The facsimile unit 10 is assembled on a frame (not shown) that is fitted in a case made up of a base chassis 12 and an upper cover 14. A telephone handset 16 is placed on the base chassis 12, and a paper cassette 20 which stores sheets of print paper 18 of a certain size is fitted detachably in the base chassis 12.

A sheet of print paper 18 is taken out of the paper cassette 20 by a paper feed roller 22 and fed by a paper feed device 28, including a paper guide 24 and a pair of feed rollers 26, to the printing device 30, by which characters and figures are printed on it. The feed rollers 26 rotate by being driven by an associated driving device (not shown) to transport the paper 18. The print paper 18 taken from the paper cassette 20 is detected at its leading edge by a paper top-edge sensor 32. The detection of the paper edge is provided to the printing device 30, which determines the timing of the commencement of printing on the paper 18 based on this signal. A paper size sensor 21 discriminates the type of paper cassettes that are prepared for various sizes of print paper. A system control unit 1 (refer to FIG. 4) implements the print control based on the paper type detected by the paper size sensor 21.

The printing device 30, which is located beneath the upper cover 14, includes a print head 34 which is controlled by a print head control circuit 33 (refer to FIG. 4), a platen 36 which is supported rotatably to confront the print head 34, and an inked ribbon device 38. The print head 34, which is the thermal transfer type, has numerous thermal elements aligned in the direction orthogonal to the paper feed direction, and certain thermal elements at positions determined by the signal from the print head control circuit 33 are heated when energized. The platen 36 is rotated by an associated driving device (not shown) to shift the print paper 18. The inked ribbon device 38 includes a thermal inked ribbon 40 having a width that covers at least the print range of the print head 34, and an inked ribbon feed device 42 which feeds the inked ribbon 40 in synchronism with the movement of the print paper 18. By the feed operation of the print paper 18 and inked ribbon 40 and the thermal activation of the print head 34 which is brought into press-contact with the print paper 18, an image is printed on the print paper 18.

The print paper 18, with the image being printed thereon, is delivered to a delivery tray 54 by being guided by a paper guide 52, and it is taken out of the facsimile unit 10. A paper evacuation sensor 56 detects the evacuation of a sheet of printed paper 18 out of the printing device 30. During a successive print operation on sheets of print paper 18, the system control unit 1 controls the paper transportation such that after the paper evacuation sensor 56 detects the evacuation of a printed paper, feeding of another sheet of paper 18 from the paper cassette 20 is started so that a paper jam does not occur.

An image reading device 62 for reading the image of a text 60 is disposed beneath the upper cover 14. The text 60 is placed between a pair of text guides 66 on a text tray 64, which is mounted detachably on the upper cover 14. The text 60 is detected at its leading edge by a text sensor 68 which is disposed beneath the upper cover 14, and is transported to the text reading position of the image reading device 62 by a text feeding device 74. The text feeding device 74 includes a pair of feed rollers 70, a paper guide 72 and another pair of feed rollers 73. The feed rollers 70 and 73 are driven by motors 78 and 80, respectively (refer to FIG. 4), and the motors 78 and 80 are driven at an equal rotational speed by drive circuits 84 and 86, respectively, under control of the system control unit 1 (refer to FIG. 4).

The image reading device 62 includes a light source 88, a lens 89, mirrors 90 and 92, and a CCD (charge coupled device) array 94. In operation, the light source 88 projects a light beam to the text 60, the lens 89 collimates the reflected light beam from the text 60, and the mirrors 90 and 92 reflect the collimated light beam onto the CCD array 94, by which the image of the text 60 is read, one line at a time. Each CCD element reads a unit area, i.e., pixel, of the text 60.

The pixel has its size in the primary scanning direction determined from various factors including the dimensions of the CCD element 94, the positions and angles of the mirrors 90 and 92, and the position and focal distance of the lens 89. The facsimile unit 10 in this embodiment has a pixel size of 0.13 mm in the primary scanning direction. The pixel size in the secondary scanning direction is determined from the feed value of the text 60 for the reading of one line of image by the image reading device 62. The facsimile unit 10 in this embodiment has selective text feed values of 0.26 mm, 0.13 mm and 0.065 mm. Accordingly, the pixel size in the secondary scanning direction is selected from 0.13 mm by 0.26 mm, 0.13 mm by 0.13 mm and 0.13 mm by 0.065 mm. The smaller the feed value for one line, the smaller the pixel area, and thus the higher the resolution of image reproduction.

The CCD array 94 is a cluster of opto-electric transducers each producing a voltage output in proportion to the intensity of incident light. The image reading device 62 delivers voltage signals produced by the CCD array 94 to the system control unit 1 in which the voltage signals are converted into binary image data. For the facsimile unit 10 of this embodiment that can read A4-sized text, the CCD array 94 is an alignment of at least 1728 CCD elements. The text reading operation is started in response to the detection of the leading edge of the text 60 by a text top-edge sensor 96. After the text 60 is read, it is discharged through an opening 98.

Figure 3:
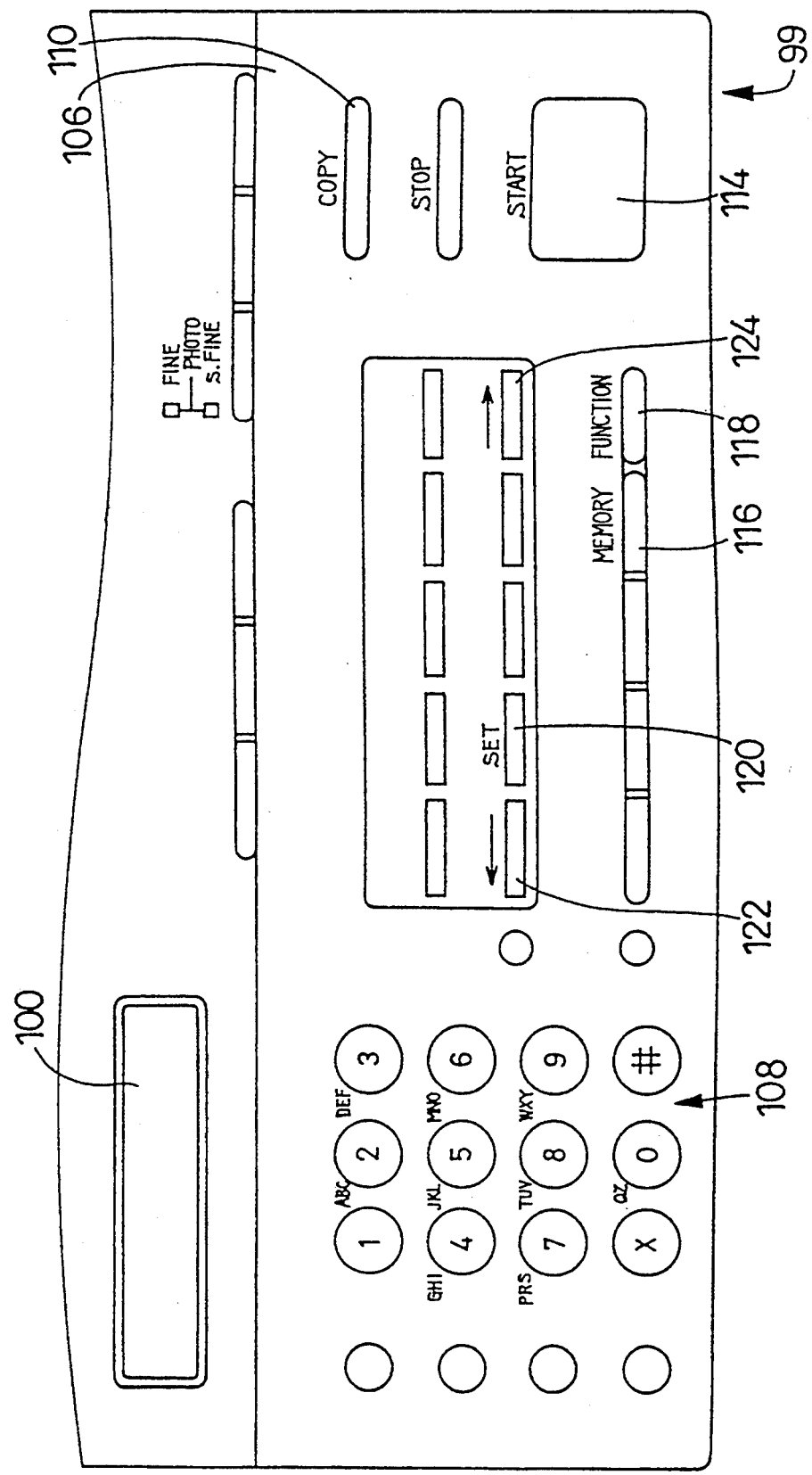
FIG. 3 is a top view of the operation panel of the facsimile unit.

FIG. 3 shows an operation panel 99 formed on the top cover 14. The operation panel 99 includes a liquid crystal display screen 100 in the upper section and a keyboard in the lower section. The keyboard 106 includes a ten-key set 108 in the left-hand section, a copy key 110 and a start key 114 in the right-hand section, and a memory key 116, a function key 118, a set key 120, and cursor keys 122 and 124 in the central section. The copy key 110 is used to instruct the copying of the text and also to instruct the commencement of the copy operation. The start key 114 is used to instruct the commencement of various other operations. The function key 118 is used to display the functions available in the facsimile unit 10, and a function is selected by using the ten-key set 108 and cursor keys 122 and 124. The set key 120 is used to validate the selection of a function, and the memory key 116 is used to instruct the transmission of stored data.

Figure 4:
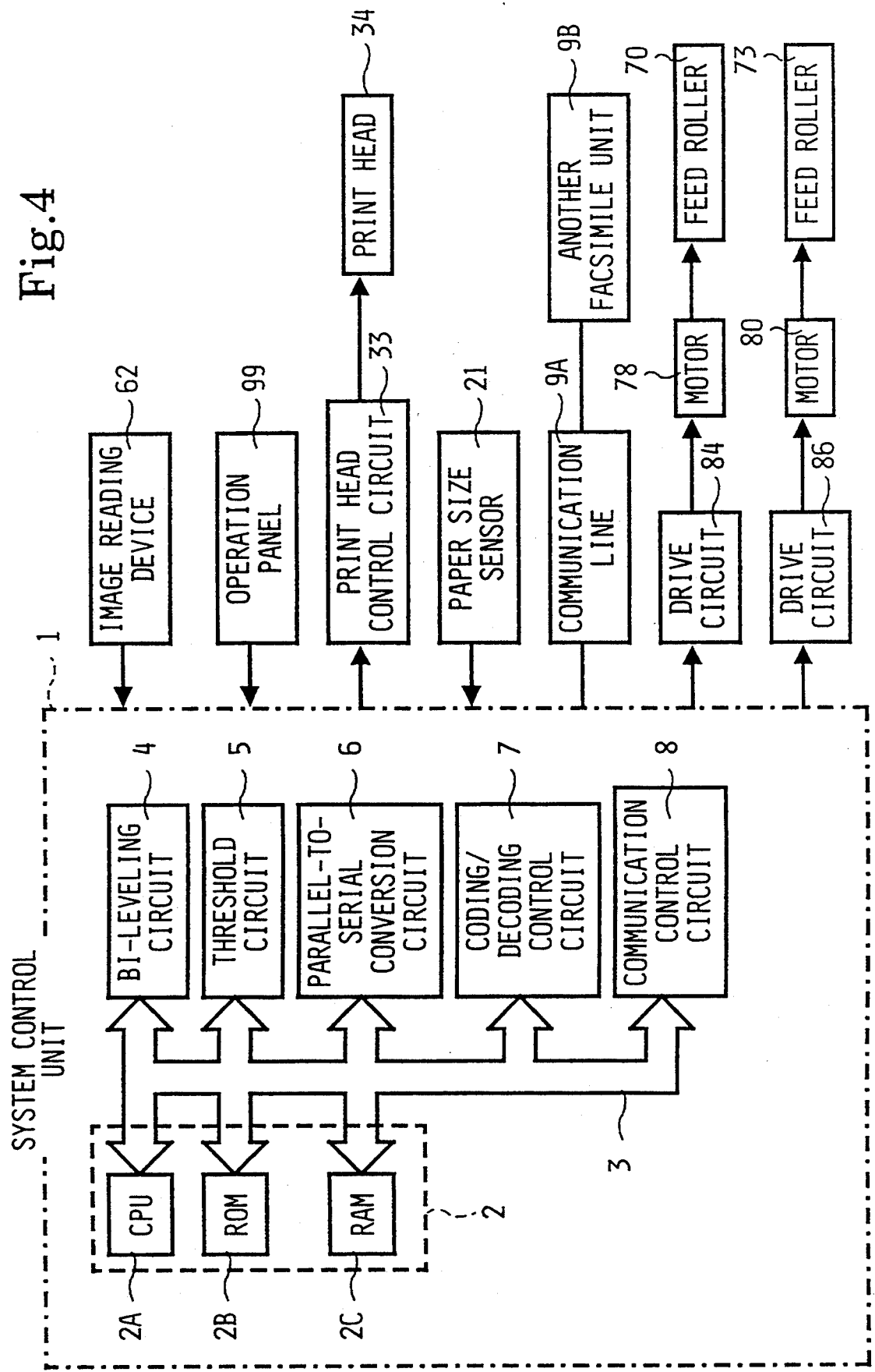
FIG. 4 is a block diagram showing the control system of the facsimile unit.

FIG. 4 is a block diagram showing the control system of the facsimile unit 10. The facsimile unit 10 is controlled by the system control unit 1, which includes as a main section a system controller 2 consisting of a CPU 2A, a ROM 2B for storing a control program, and a RAM 2C. The RAM 2C forms a reading buffer for latching image data provided by the image reading device 62, a sending buffer for holding compressed coded image data to be transmitted, a receiving buffer for holding compressed coded image data that has been received, and a printing buffer for holding print data resulting from the decoding process for the received compressed coded image data.

The system controller 2 is connected through a bus 3 with a bi-leveling circuit 4, a threshold circuit 5, a parallel-to-serial conversion circuit 6, a coding/decoding control circuit 7 which implements the compressed-coding and decoding for image data, and a communication control circuit 8 which sends and receives compressed coded image data. The system control unit 1 is connected with the image reading device 62, the print head control circuit 33, the operation panel 99, the paper size sensor 21 and other sensors (not shown) including the paper top-edge sensor 32, the paper evacuation sensor 56, the text sensor 68 and text top-edge sensor 96, the roller drive circuits 84 and 86, and the external communication line 9A.

The bi-leveling circuit 4 converts the image signal produced by the image reading device 62 into binary data based on the comparison of the image signal with the threshold value provided by the threshold circuit 5, delivering a "0" (white) level output when the image signal is larger than the threshold value or delivering a "1" (black) level otherwise. When binary data for one line is produced, it is held in the reading buffer of the RAM 2C. The threshold circuit 5 supplies stored threshold value data to the bi-leveling circuit 4 in response to the command of the system controller 2.

The parallel-to-serial conversion circuit 6 converts parallel data as a result of the process by the system controller 2 into serial data to be fed to the print head control circuit 33. The coding/decoding control circuit 7 implements the compressed-coding for binary image data and the decoding for compressed coded image data coming from the outside before it is held in the RAM 2C. The communication control circuit 8 implements the communication of the facsimile unit (as a sending unit or a receiving unit) with another facsimile unit 9B (as a receiving unit or a sending unit) over the external communication line 9A that links the two facsimile units.

Figure 5:
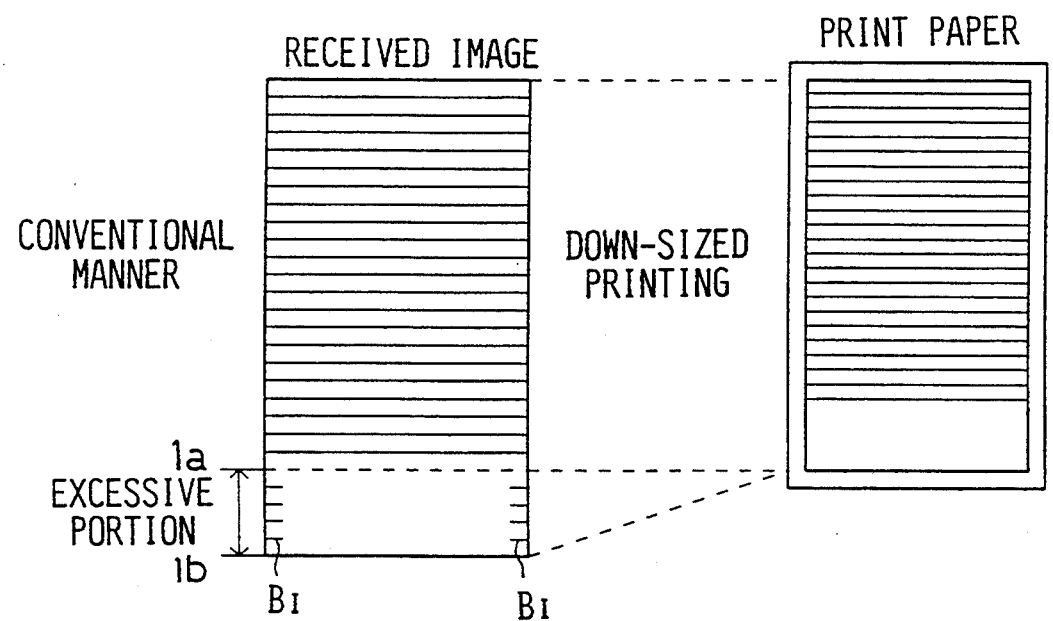
FIG. 5A is a diagram showing received image information and a down-sized (reduction size) print of the image information based on a conventional facsimile unit.
FIG. 5B is a diagram showing the received image information and a real-size (the same size) print of the image information based on the inventive facsimile unit.
Figure 5:
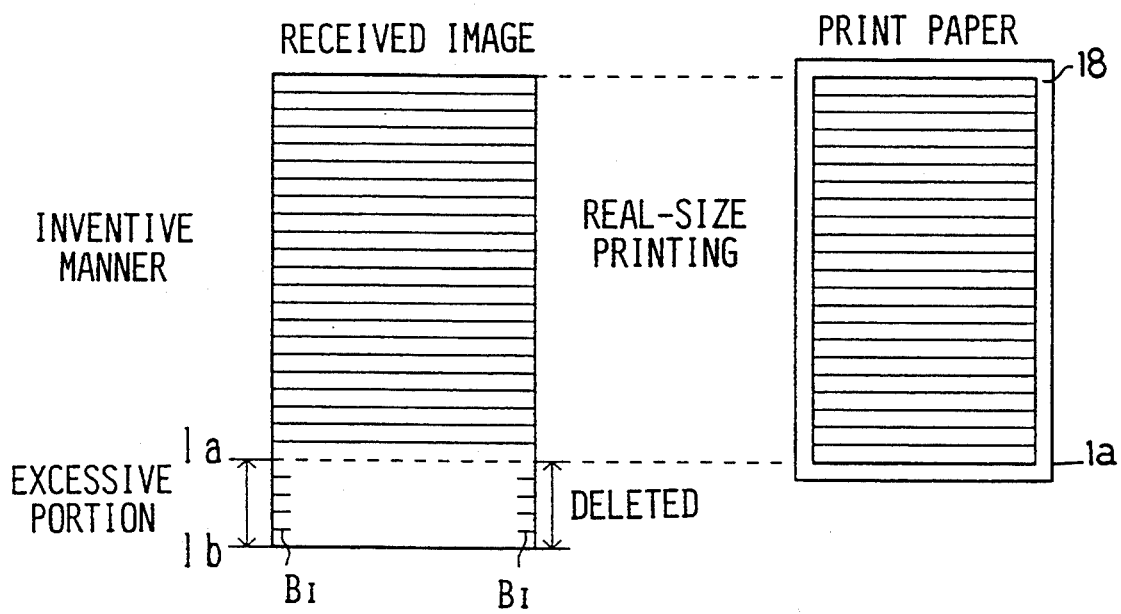
Figure 6A:
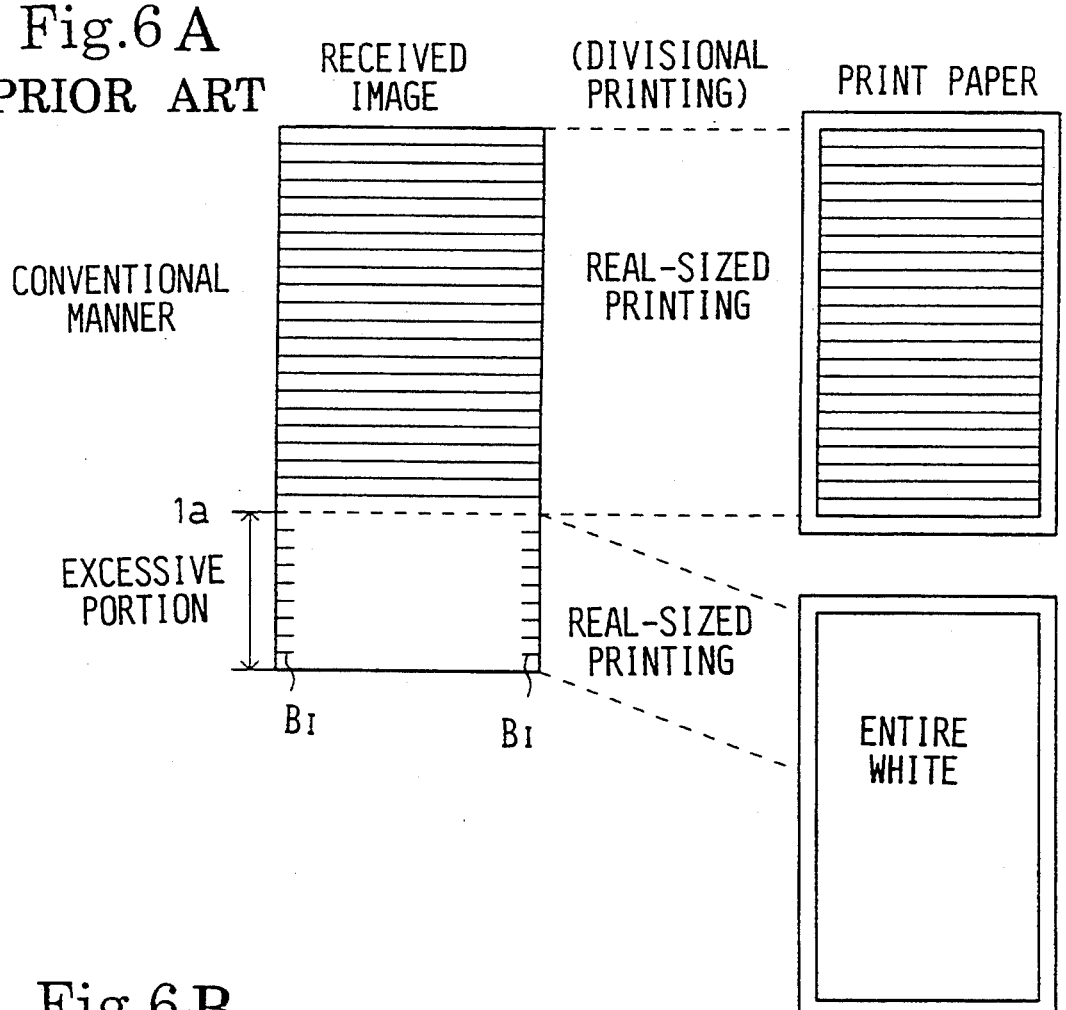
FIG. 6A is a diagram showing received image information and divided prints of the image information based on the conventional facsimile unit.
Figure 6B:
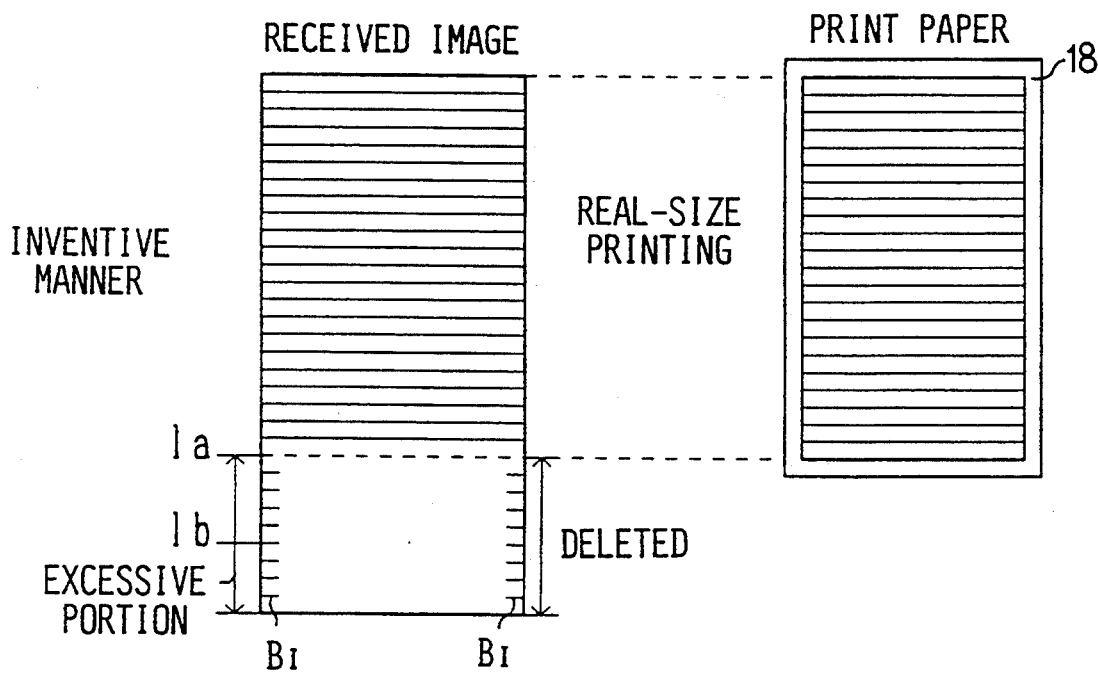
FIG. 6B is a diagram showing the received image information and a real-size print of the image information based on the inventive facsimile unit.

The print operation for image information received by the facsimile unit 10 structured as described above will be explained in contrast to the operation of the conventional facsimile unit with reference to FIG. 5 through FIG. 8. FIGS. 5A and 6A show received image information and the manner of printing on the print paper in the conventional facsimile unit, and FIGS. 5B and 6B show received image information and the manner of printing on the print paper 18 in the inventive facsimile unit. In both cases, the received image information has a page length in the secondary scanning direction longer than the length of print paper 18, with the excessive portion including black-pixel information BI in sections outside of the effective print range. FIGS. 5A and 5B are the cases where image information inclusive of the excessive portion does not exceed the maximum number of lines and the whole image information can be printed by size reduction on a sheet of print paper 18. FIGS. 6A and 6B are the cases where image information inclusive of the excessive portion exceeds the maximum number of lines and the whole image information cannot be printed even by size reduction on a sheet of print paper 18.

The conventional facsimile unit does not recognize the excessive image portion as white lines if it includes black-pixel information BI in sections outside of the effective print range as shown in FIG. 5A. Consequently, it prints the received image information inclusive of the insignificant excessive portion intact by size reduction, resulting in down-sized characters in the printed output.

In contrast, the facsimile unit 10 in this embodiment according to the invention recognizes the excessive image portion as white lines even if it includes black-pixel information BI in sections outside of the effective print range as shown in FIG. 5B. Consequently, it excludes the excessive portion in printing and reproduces a real-size print of the received image information on a sheet of print paper 18.

Since the conventional facsimile unit does not recognize the excessive image portion as white lines if it includes black-pixel information BI in sections outside of the effective print range, it divides the received image information for real-size printing and produces a useless blank second page as shown in FIG. 6A.

In contrast, the facsimile unit 10 in this embodiment according to invention, which recognizes the excessive image portion as white lines even if it includes black-pixel information BI in sections outside of the effective print range, is capable of excluding the excessive image portion and reproducing the received image information without dividing the image and without wasting the print paper on a sheet of print paper 18 as shown in FIG. 6B.

Figure 7:
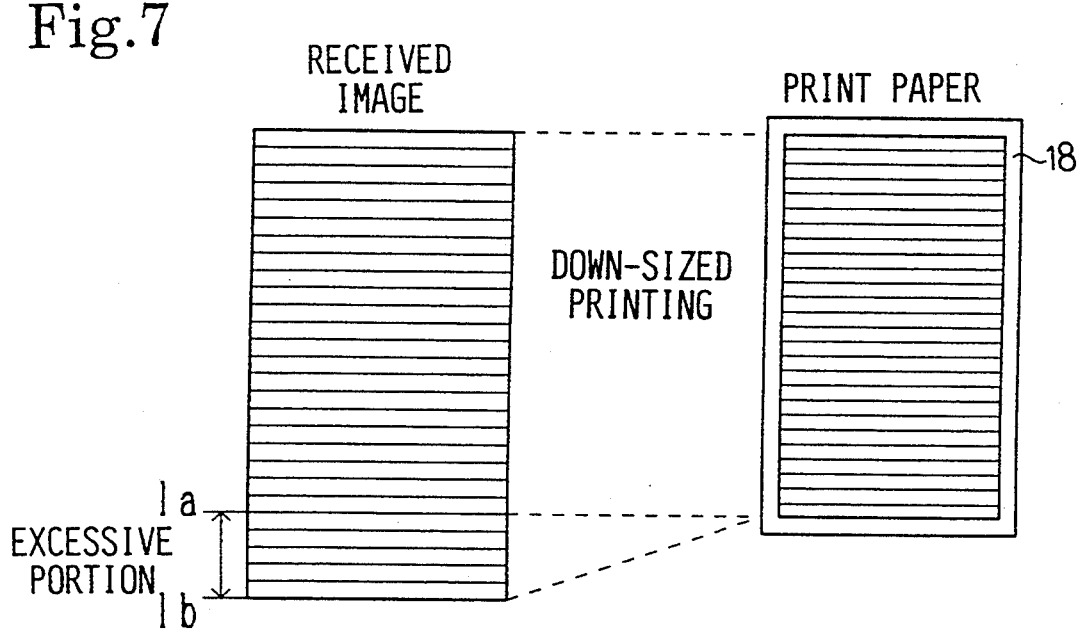
FIG. 7 is a diagram showing received image information and a down-sized print of the image information when it includes non-white lines in an excessive area based on the inventive facsimile unit.
Figure 8:
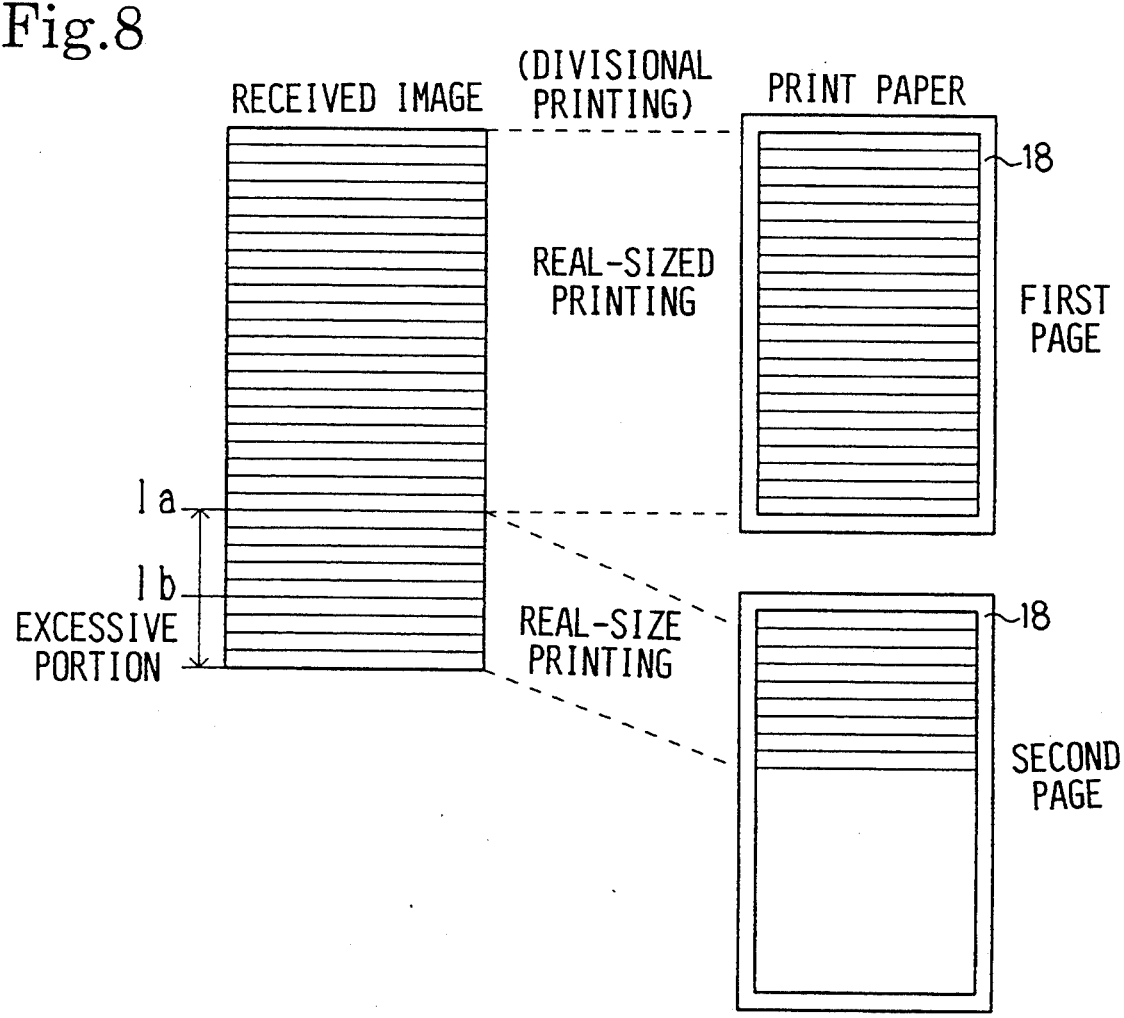
FIG. 8 is a diagram showing received image information and divided prints of the image information when it includes non-white lines in an excessive area based on the inventive facsimile unit.

FIG. 7 shows the manner of down-sized printing for received image information that includes an excessive portion of black lines on a sheet of print paper in the conventional facsimile unit and the facsimile unit in this embodiment according to invention. FIG. 8 shows the manner of divisional printing for received image information that includes an excessive portion of black lines on sheets of print paper in the conventional facsimile unit and the facsimile unit in this embodiment according to invention. In these two cases, image information is treated in the same manner by the conventional facsimile unit and the unit of this embodiment.

Figure 9A:
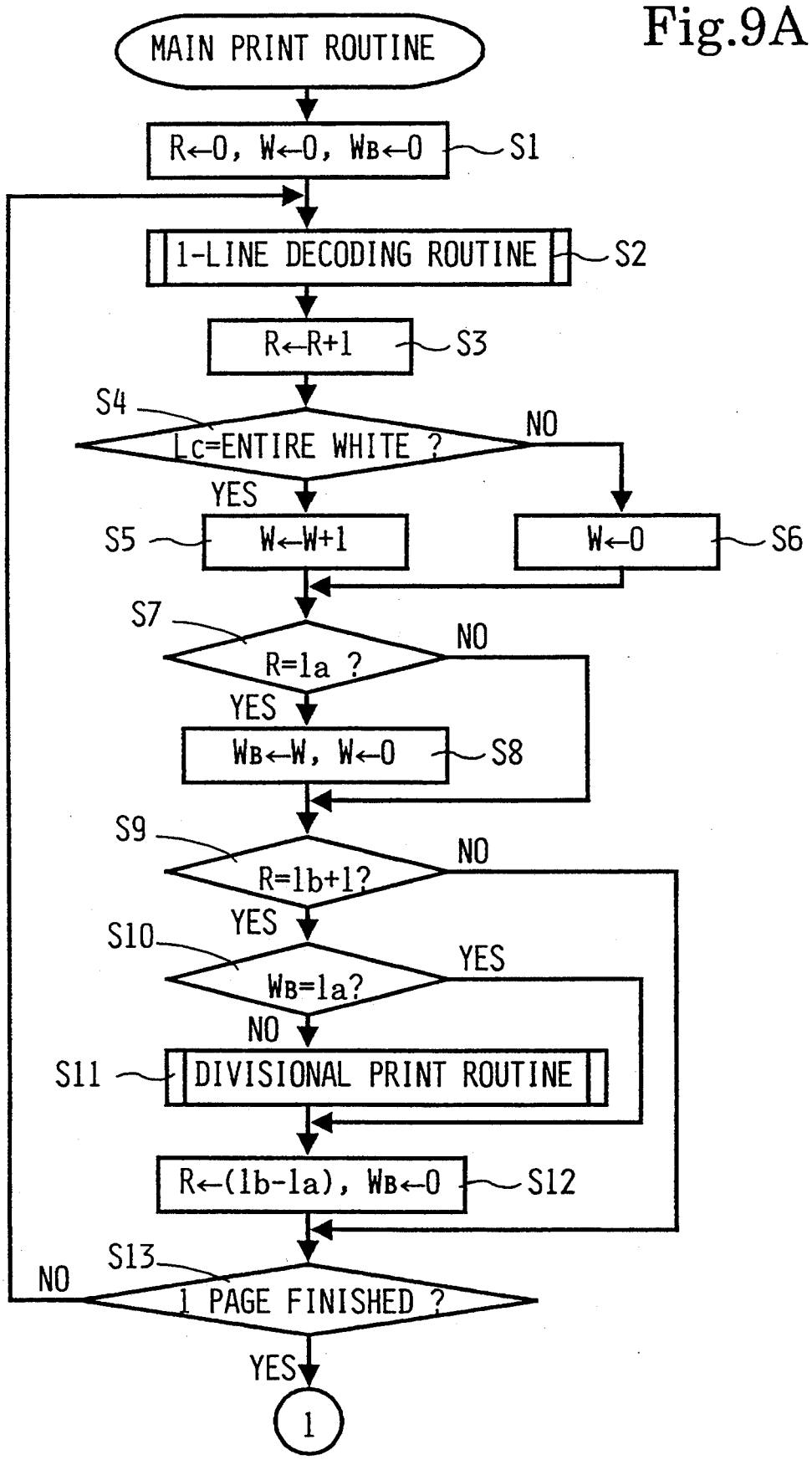
FIGS. 9A and 9B are a flowchart showing the print operation for received image information based on the inventive facsimile unit.
Figure 9B:
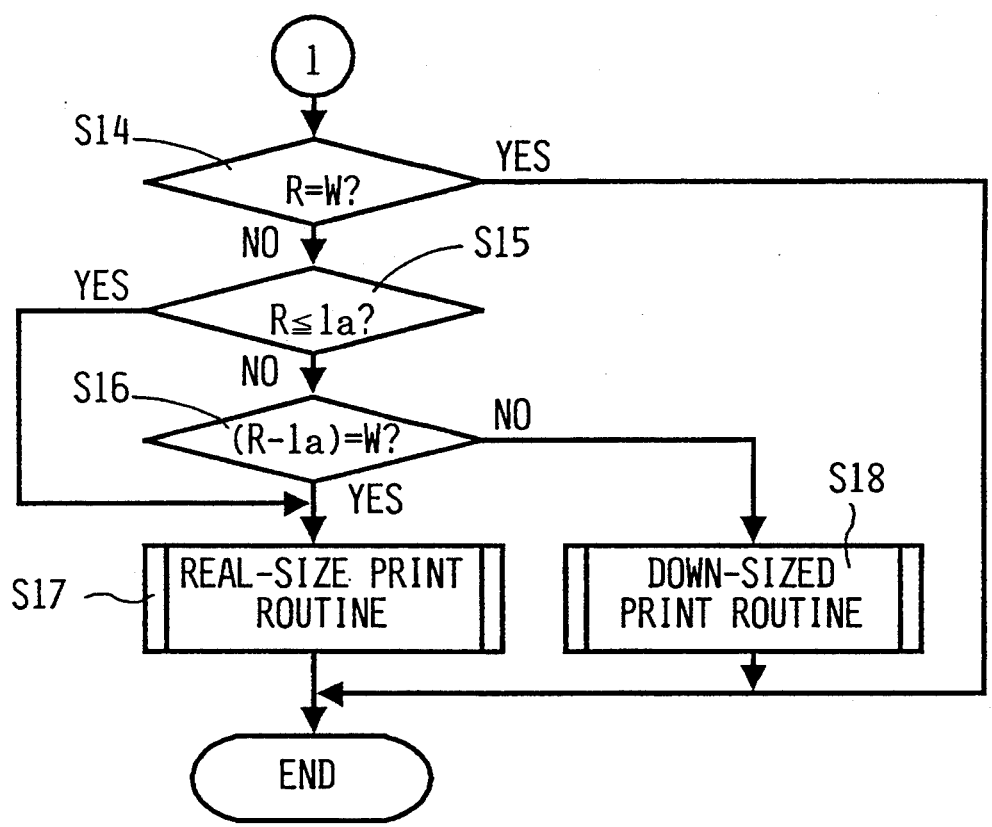
Figure 10:
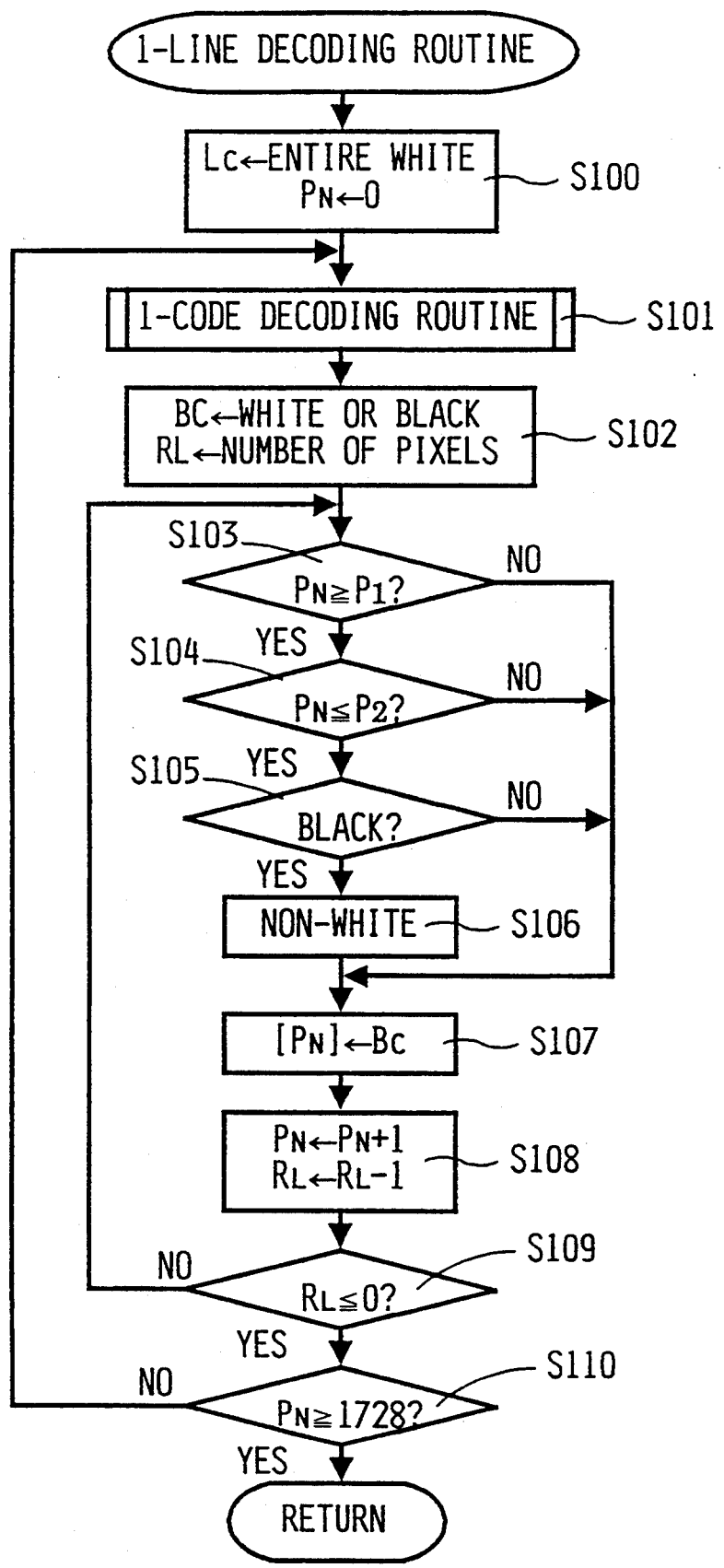
FIG. 10 is a flowchart showing the decoding process for one line of image information based on the inventive facsimile unit.

Next, the printing operation of the facsimile unit 10 in this embodiment according to the invention will be explained with reference to FIG. 9 through FIG. 11 in addition to the preceding figures. Initially, how the print operation for the image information, as shown in FIG. 5B, is sent from another facsimile unit (sending unit) 9B to the facsimile unit (receiving unit) 10 will be explained.

The sending and receiving facsimile units 9B, 10 are linked through the communication line 9A. The sending unit 9B sends a signal indicative of "one-page compressed coded image data is sent," and on receiving the signal, the receiving unit 10 commences the print control as shown in FIG. 9.

At the beginning, the CPU 2A in the system control unit 1 clears the contents of the reception line counter R, consecutive white line counter W and consecutive white line hold counter WB in the RAM 2C (step 1). The consecutive white line hold counter WB holds the value of the consecutive white line counter W when the number of received lines becomes equal to the number of lines that can be printed on a sheet of print paper 18. Subsequently, the CPU 2A implements the decoding process for converting the image data of one line among the image data, which has been sent from the sending unit 9B and stored in the receiving buffer in RAM 2C, into pixel data (step 2).

The decoding process for one-line image data will be explained in detail with reference to FIGS. 10 and 11.

Figure 11:
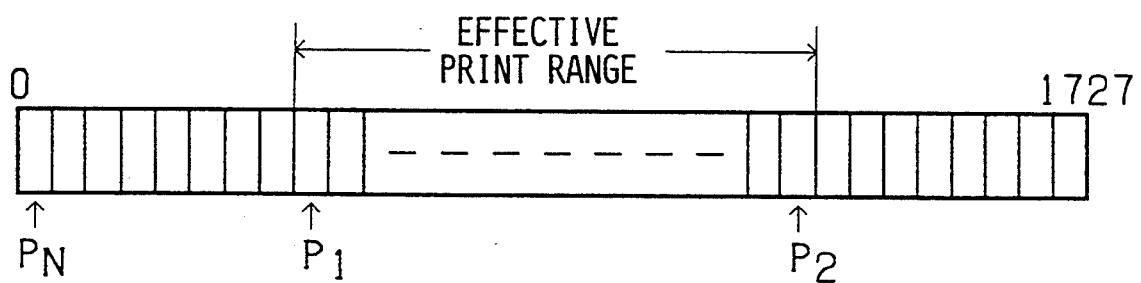
FIG. 11 is a diagram showing the effective print range of a line of readout image information.

The one-line image information sent from the sending unit 9B includes 1728 pixels, and the effective print range in the primary scanning direction on the print paper 18 is defined by pointers P1 and P2 as shown in FIG. 11. Received image information consists of a set of codes each representing a string of the different number of white and black pixels derived from a white/black dot pattern of the text read by the sending unit 9B.

The CPU 2A initially sets "entire white" for color information LC for one-line image data and sets "0" for a bit pointer value PN in the RAM 2C (step 100). It decodes one code out of the received image data (step 101), and sets a pixel color ("white" or "black") to the BC register and the number of pixels to the RL register depending on the decoding result (step 102).

Next, the CPU 2A determines whether the bit pointer PN is within the effective print range between the pointers P1 and P2 (steps 103, 104). If the value PN is within the P1–P2 range (step 103: yes and step 104: yes), the CPU 2A determines whether the pixel color BC is black (step 105). If the pixel color is black (step 105: yes), the CPU 2A sets "black" for the color information LC (step 106), and proceeds to step 107.

Otherwise, if the bit pointer PN is not within the P1–P2 range (step 103: no or step 104: no), or if the pixel color BC is not "black" (step 105: no) even if PN is within the P1–P2 range, the CPU 2A skips the step 106 and proceeds to step 107.

The CPU 2A sets the pixel color BC to the address [PN] indicated by the bit pointer PN (step 107), and thereafter increments the bit pointer value PN by one and decrements the number of pixels RL by one (step 108). The CPU 2A judges whether the number of pixels RL goes negative indicative of the completion of decoding process for one code of the received image data (step 109). At the beginning, the number of pixels RL is not yet zero (step 109: no), and the CPU 2A returns to step 103 to repeat the operation of steps 103–109 until the number of pixels RL reaches zero when the decoding process for one code finishes (step 109: yes). The CPU 2A judges whether the bit pointer value PN exceeds 1728 indicative of the completion of decoding process for one line of the received image data (step 110). If it is not yet finished (step 110: no), the CPU 2A repeats the operation of steps 101–110 until the decoding process for one complete line of received image data finishes (step 110: yes). The CPU 2A goes out of the one-line decoding routine and returns to step 3 of the main print routine of FIG. 9.

Following the formation of print data of one complete line through the above-mentioned decoding process (step 2), the CPU 2A increments the reception line counter R by one (step 3). Subsequently, it determines whether the color information LC of the decoded line is entirely white (step 4). If the color information LC is entirely white (step 4: yes), the CPU 2A increments the consecutive white line counter W by one (step 5); and if the color information LC is not entirely white (step 4: no), it clears the consecutive white line counter W (step 6).

The CPU 2A judges whether the reception line count value R has become equal to the number of lines la that can be printed in real-size on the print paper 18 as shown in FIG. 5B (step 7). If these values R and la are not yet equal (step 7: no), the CPU 2A proceeds to step 9 in which it judges whether the reception line count value R has become equal to the number of print lines lb, which can be printed in reduced-size on the print paper 18, plus one (step 9). If the values R and lb+1 are not yet equal (step 9: no), the CPU 2A judges whether the decoding process for one complete page of received image information has finished based on the presence or absence of the RTC code indicative of "page end" in the one-line print data (step 13). If the RTC code is not yet detected (step 13: no), the CPU 2A returns to step 2 to repeat the above-mentioned operation.

After that, when the CPU 2A detects the equality of the reception line count value R to the number of real-size print lines la (step 7: yes), it saves the consecutive white line count value W in the consecutive white line hold counter WB and clears the counter W (step 8). In the case of the received image information shown in FIG. 5B, the excessive portion does not exceed the number of down-sized print lines lb and the CPU 2A makes a "no" judgement in step 9 and proceeds to step 13 by skipping steps 10–12. The decoding process for one complete page is not yet finished (step 13: no), and the CPU 2A returns to step 2 and repeats the operation of steps 2–9 and 13 until the decoding process for one complete page is complete.

On completion of the decoding process for one complete page of received image information (step 13: yes), the CPU 2A judges whether the reception line count value R is equal to the consecutive white line count value W (step 14). As the received image information is not entire white lines in this example, the CPU 2A makes a "no" judgement (step 14: no). The CPU 2A judges whether the reception line count value R is smaller than or equal to the number of lines la that can be printed in real-size on the print paper 18 (step 15). The count value R is larger than the value la in this example (step 15: no), and the CPU 2A subsequently judges whether the difference R−la, i.e., the number of lines of excessive portion, is equal to the value W (step 16). Since the excessive portion within the effective print range is entirely white in this example, these values R−la and W are equal (step 16: yes) and the CPU 2A implements the one-page real-size printing for the image information on a sheet of print paper 18, with the excessive portion of the received image information being deleted, as shown in FIG. 5B.

Next, the print operation for the image information as shown in FIG. 6B sent from another facsimile unit will be explained. In this example, the number of received lines exceeds the number of lines lb that can be printed in reduced-size, and therefore the step 9 of the main print routine produces a "yes" judgement. The CPU 2A judges whether the consecutive white line hold value WB is equal to the number of real-size print lines la, i.e., whether the image information of la lines within the effective print range in the primary scanning direction is entire white (step 10). These lines are not entire white, i.e., the values WB and la are not equal, in this example (step 10: no), and the CPU 2A implements the real-size divisional printing for the image information on a sheet of print paper 18, with the excessive portion of the received image information being deleted (step 11), as shown in FIG. 6B.

Following the print operation, the CPU 2A sets the difference lb−la between the number of lines lb that can be printed in reduced-size and the number of lines la that can be printed in real-size on the print paper 18 to the reception line counter R, and clears the consecutive white line hold counter WB (step 12). The CPU 2A returns to step 2 to repeat the operation of steps 2–13 until the decoding process for one complete page of received image information finishes.

On detecting the end of decoding process for one complete page of received image information (step 13: yes), the CPU 2A determines whether the reception line count value R is equal to the consecutive white line count value W (step 14). Since the excessive portion of image information, i.e., image information within the effective print range to be printed divisionally on the second page of print paper, is entire white in this example, these values R and W are equal (step 14: yes). Consequently, nothing is printed on the second page of print paper, and the blank paper that results in the case of the conventional facsimile unit, as shown in FIG. 6A, is prevented from being delivered by the invention.

If, in step 10, la lines of received image information within the effective print range are entirely white, the consecutive white line hold value WB is equal to the number of real-size print lines la (step 10: yes), and the CPU 2A skips the divisional print operation (printing on the first page) of step 11 and proceeds to step 12.

In another case, as shown in FIG. 7, where one-page image information includes an excessive portion that does not exceed the number of down-sized print lines that can be printed on the print paper 18 and, at the same time, this excessive portion is not entirely white, the reception line count value R is larger than the number of real-size print lines la (step 15: no). In step 16, since the excessive portion of received image information is not entirely white, the difference R−la between the reception line count value R and the number of real-size print lines la, i.e., the number of lines of the excessive portion, is not equal to the consecutive white line count value W (step 16: no). Consequently, the CPU 2A implements the down-sized printing so that the received image information of one page is printed on a sheet of print paper 18 as shown in FIG. 7.

In still another case, as shown in FIG. 8, where one-page image information includes an excessive portion that exceeds the number of down-sized print lines that can be printed on the print paper 18 and, at the same time, this excessive portion is not entirely white, the CPU 2A makes a "yes" judgement in step 15 following the real-size divisional printing on the first page of print paper in step 11, and it thereafter implements the real-size printing for the excessive portion on the second page of print paper in step 17 as shown in FIG. 8.

The foregoing print operation is summarized as follows. In the case where one-line image information within the effective print range among image information received from another facsimile unit consists of only white pixels, this line is determined to be a white line. If the page length in the secondary scanning direction of received image information is longer than the length of the print paper 18 and the excessive portion within the effective print range is only white pixel information irrespective of the presence of black pixel information outside of the effective print range, the received image information is printed on a sheet of print paper 18 by excluding the excessive portion (refer to FIGS. 5B and 6B). If image information within the effective print range is not white pixel information only, it is printed by being divided between two sheets of print paper (refer to FIG. 8), or it is printed by being down-sized on a sheet of print paper (refer to FIG. 7). Consequently, it becomes possible to prevent the reproduction of too small characters of text as a result of unnecessary size reduction and the delivery of a useless blank print paper as a result of unnecessary division of image information.

Next, the image signal transmitting operation of the facsimile unit 10 in this embodiment will be explained with reference to FIGS. 12 and 13A–13C.

Initially, the operator places a text 60 between the pair of text guides 66 on the text tray 64 of the facsimile unit 10 as shown in FIG. 2. The operator specifies the resolution of the image processing by operating the function key 118 and other keys shown in FIG. 3. Next, the operator enters the facsimile number of the receiving unit 9B by using the ten-key set 108 and presses the start key 114. The facsimile unit 10 is linked to the receiving unit 9B through the communication line 9A and communication is established between the two units 10,9B. A signal indicative of all resolution factors available on the receiving unit 9B is sent from the receiving unit 9B to the unit 10. In the facsimile unit 10, resolution factors that are available in the facsimile unit 10 but not in excess of that set by the operator and are coincident with the received resolution factors of the receiving unit 9B are searched and the highest one among the factors is selected. A signal indicative of the selected resolution factor is sent to the receiving unit 9B.

The unit 10 also receives information on the size of the print paper 18 that is set in the receiving unit 9B. The number of lines that can be printed on the print paper 18 is calculated based on the determined resolution factor, and it is set in a deletion line counter (not shown) of the facsimile unit 10. The facsimile unit 10 operates on the image reading device 62 to start the reading of the text 60. Each time a line of image has been read, the text 60 is shifted by the amount depending on the determined resolution factor by the feed rollers 70,73. The readout image signal is fed to the bi-leveling circuit 4, by which it is compared with the threshold value and converted into binary data. The binary image data is held in the reading buffer in the RAM 2C.

On each completion of reading for one line in the above-mentioned operation, image information outside of the effective print range of the receiving unit 9B is replaced with white-pixel information. This process will be explained using the flowchart of FIG. 12.

Image information of one line is read (step 200), and the CPU 2A sets "0" for the bit pointer value PN in the RAM 2C (step 201). The CPU 2A judges whether the bit pointer value PN is within the effective print range P1–P2 of the receiving unit 9B (refer to FIG. 11) (steps 203, 204). If the value PN is within the range P1–P2 (step 203: no and step 204: no), the CPU 2A proceeds to step 206. Otherwise, if the value PN is outside of the range P1–P2 (step 203: yes or step 204: yes), the CPU 2A sets a white pixel at address "PN" indicated by the bit pointer (step 205), and proceeds to step 206.

The CPU 2A increments the bit pointer PN by one (step 206), and judges whether it exceeds 1728, i.e., whether the white pixel replacement process for one complete line of readout image data has finished (step 207). It is not yet finished at the beginning of the processing for a line (step 207: no), and the CPU 2A repeats the operation of steps 203–207 until the white pixel replacement process for one complete line finishes. On completion of the one-line pixel replacement process (step 207: yes), the CPU 2A implements the coding process for the line of readout image data (step 208). After the one-line image data has been coded, the CPU 2A judges whether the reading of one complete text page has finished (step 209). It is not yet finished at the beginning of the processing (step 209: no), and the CPU 2A repeats the operation of steps 200–209 until the reading of one text page finishes. On completion of one page text reading (step 209: yes), the CPU 2A terminates the operation.

Figure 12:
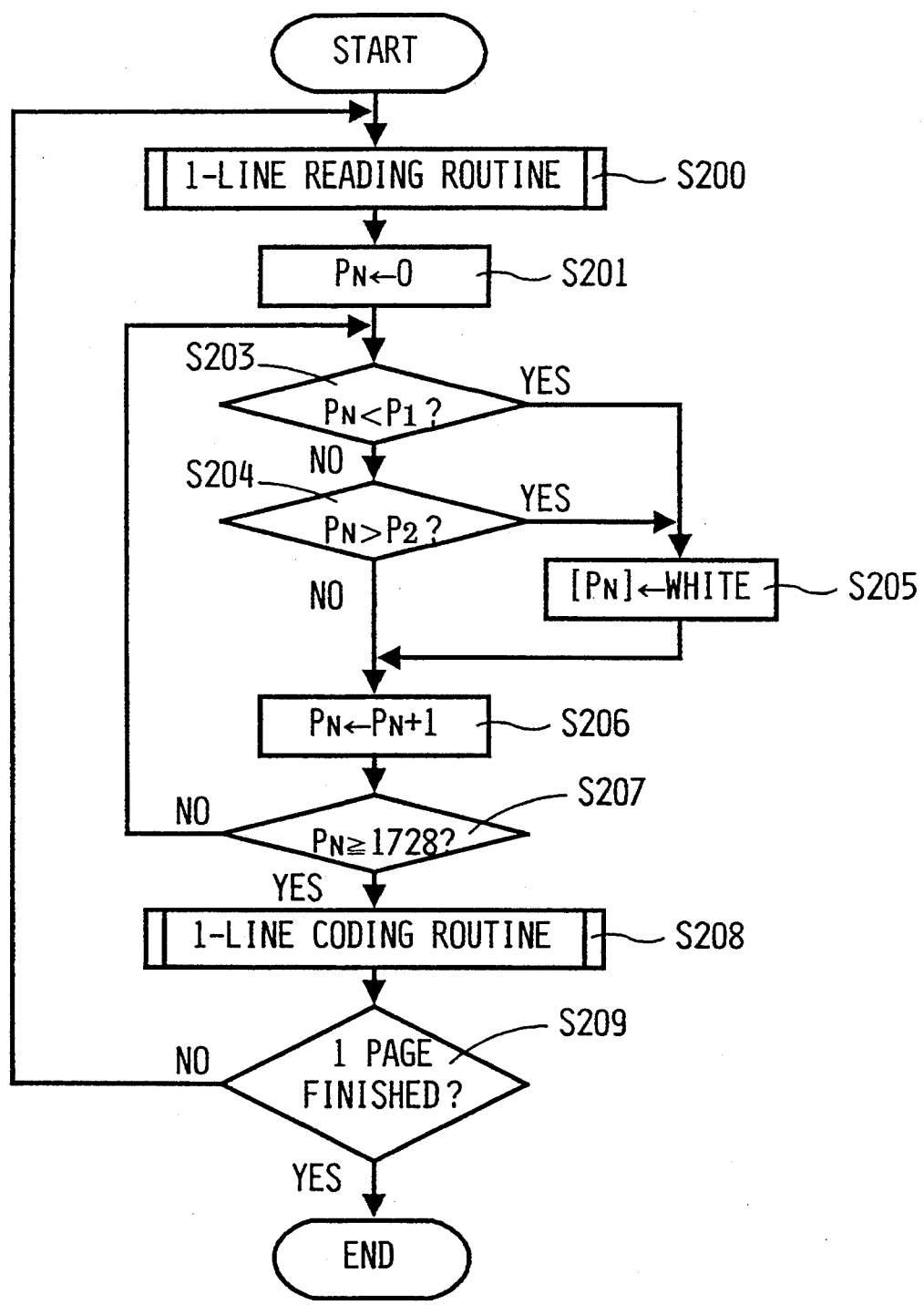
FIG. 12 is a flowchart showing the white pixel converting process for the image information outside of the effective print range of the receiving facsimile unit.
Figure 13:
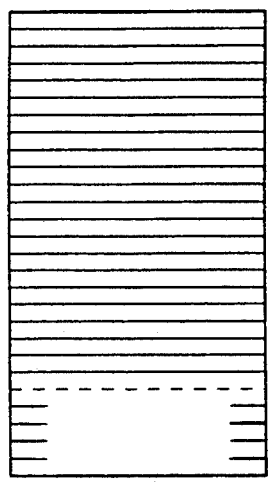
FIGS. 13A, 13B and 13C are a set of diagrams explaining the white pixel converting process of FIG. 12.
Figure 13:
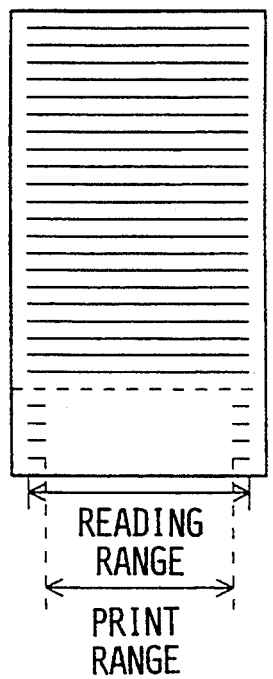
Figure 13:
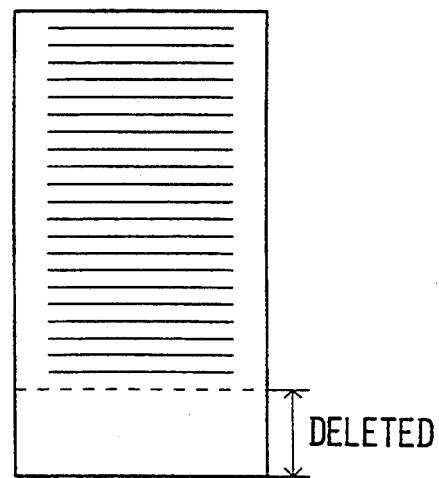

In the case where the facsimile unit 10 has read the text shown in FIG. 13A through the operation explained using FIG. 12, the image information processed in step 200 includes black pixel information inside of the reading range as shown in FIG. 13B. By execution of the white pixel replacement process of steps 203–207, the image information which will be sent includes black pixel information only within the print range of the receiving unit 9B. Even if there is black pixel information in the excessive portion of the text page and outside of the print range of the receiving unit 9B, it is deleted from the image information to be sent. Consequently, the receiving unit 9B prints the received image information without requiring an unnecessary size reduction nor a page division.

In the facsimile unit 10 of the foregoing first embodiment, received image information is held in the reception buffer and undergoes the bi-leveling process, decoding process and parallel-to-serial data conversion process before it is fed to the thermal head of the printing device. However, when a large quantity of image information is sent to the facsimile unit 10 from another unit 9B, the following problems can possibly arise. Even during a period when the print operation for image data in the reading buffer is suspended for the judgement of white lines for the excessive portion of a text page, incoming image information is fed to the receiving buffer uninterruptedly. Eventually the buffer will overflow, resulting in the occurrence of reception error of the facsimile unit 10. A white line has its print range made up of only white pixels, and an entire white line is included in this category. The facsimile unit in a second embodiment according to the invention that is capable of preventing the above-mentioned overflow of the receiving buffer will be explained. The arrangement of this facsimile unit is identical to that of the first embodiment with the only difference being the manner of print control. Component parts identical to those of the first embodiment will be referred to by the same symbols and the explanation of the common arrangement will not be repeated.

This facsimile unit uses a thermal inked ribbon 40 having a width that covers at least the print range of the print head 34. The inked ribbon 40 is fed in response to the shift of the print paper 18 even if nothing is printed on it. For the conservation of inked ribbon and the prevention of reception error due to the overflow of receiving buffer, the print operation is carried out as follows.

Figure 14:
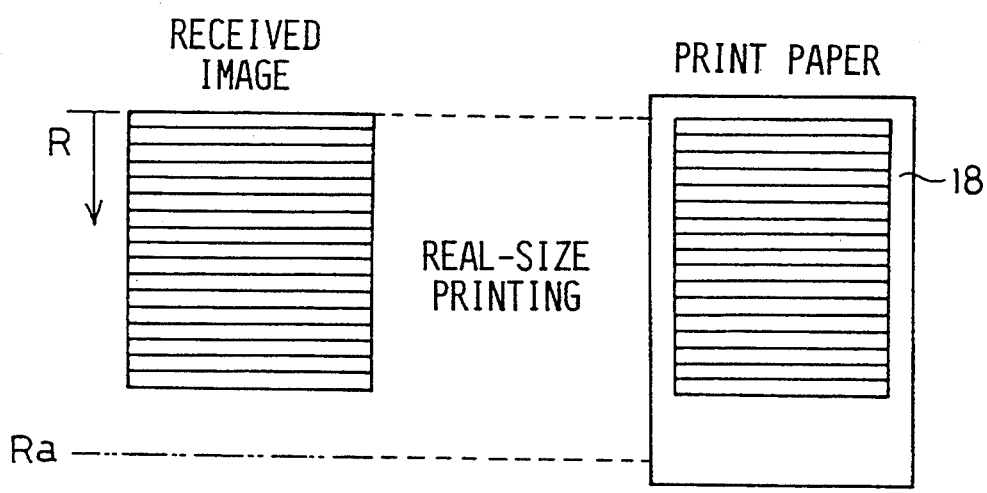
FIG. 14 is a diagram showing received image information and a real-size print of the image information based on the facsimile unit in the second embodiment according to the invention.

If the number of lines on a page of received image information is within a first prescribed value Ra that corresponds to the length of print paper 18 in the secondary scanning direction, the one-page image information is printed in real-size on a sheet of print paper 18 as shown in FIG. 14.

Figure 15:
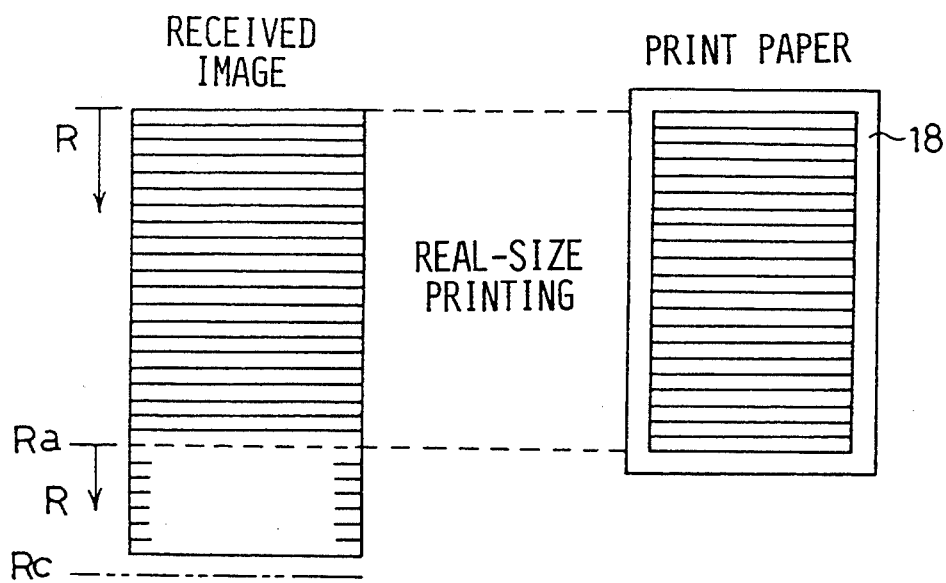
FIG. 15 is a diagram showing received image information and a real-size print of image information based on a facsimile unit in the second embodiment according to the invention.

If the number of lines on a page of received image information is larger than the first prescribed value Ra and smaller than a second prescribed value Rc, an image data portion from the first line to the Ra-th line is printed in real-size on a sheet of print paper 18, and if all remaining lines following the Ra-th line are white lines in which no black pixel is included within the effective print range, image information of these white lines is not printed as shown in FIG. 15.

If the number of lines on a page of received image information is larger than the first prescribed value Ra and larger than the second prescribed value Rc, an image data portion from the first line to the Ra-th line is printed in real-size on a sheet of print paper 18, and printing of image information of the remaining lines following the Ra-th line is commenced when the line count has reached the value Rc irrespective of these lines being white lines or not. Consequently, the occurrence of reception error due to the overflow of the receiving buffer can be prevented. In this case, if the remaining lines following the Ra-th line are all white lines, the print operation that has been commenced for the lines is halted immediately, and a sheet of print paper 18 of the second page on which nothing is printed is delivered.

A counter R that counts the number of lines on a page of received image information, a counter W that counts the number of consecutive white lines and other various counters that will be explained later are formed in the RAM 2C.

The above-mentioned second prescribed value Rc, which is larger than the first prescribed value Ra, is set appropriately so that the receiving buffer does not overflow when printing for up to Rc−Ra lines is suspended.

Figure 17:
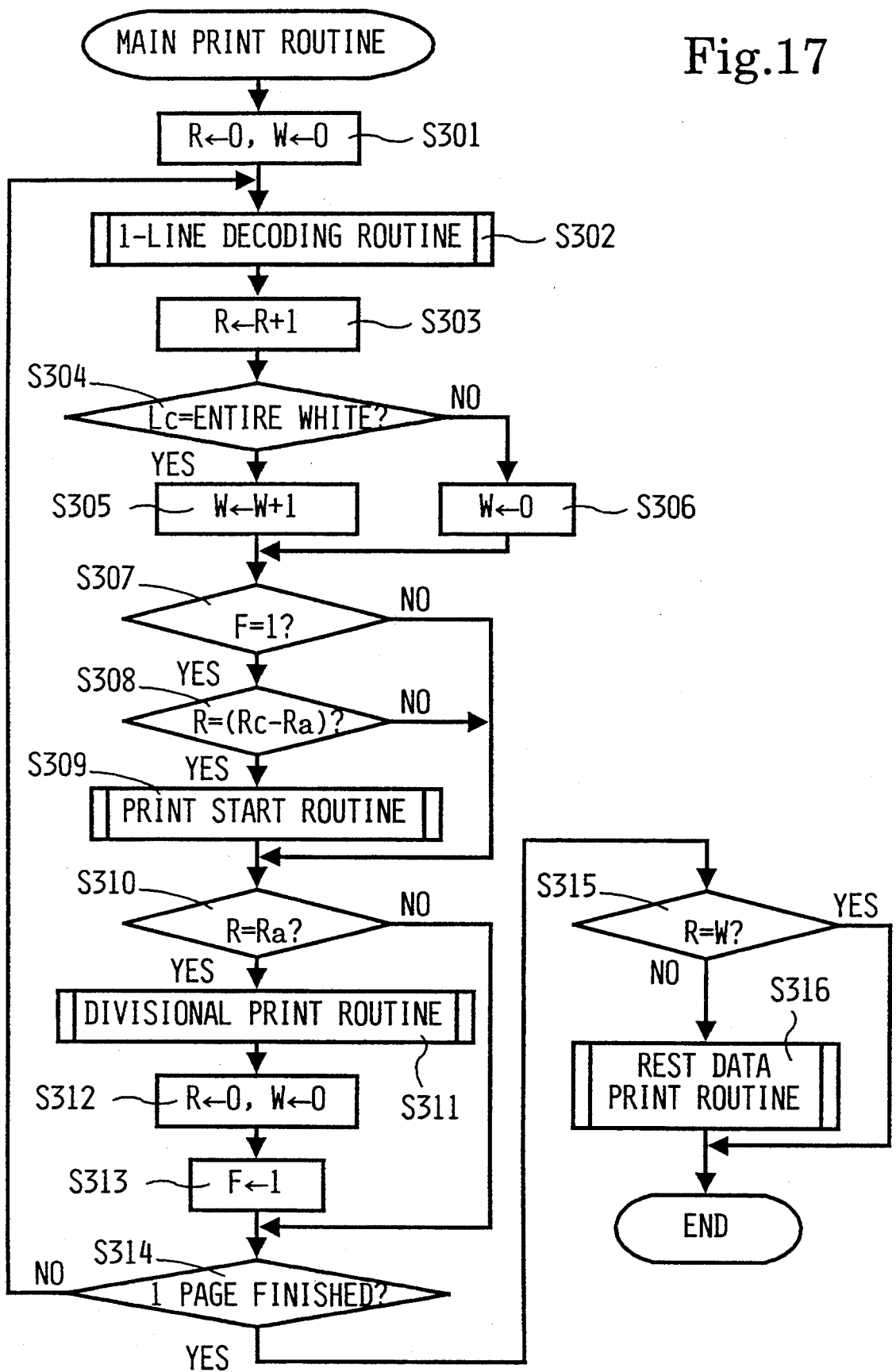
FIG. 17 is a flowchart showing the print operation for received image information based on the facsimile unit in the second embodiment according to the invention.

Next, the print control process of the facsimile unit in the second embodiment will be explained using the flowchart of FIG. 17.

The facsimile unit 10 is linked with the sending unit 9B through the communication line 9A. On receiving a signal indicative of "one-page compressed coded image data is sent" from the sending unit 9B, the facsimile unit 10 commences the print operation shown in FIG. 17.

Initially, the CPU 2A in the system control unit 1 clears the reception line counter R and the consecutive white line counter W formed in the RAM 2C (step 301). Subsequently, the CPU 2A implements the decoding process for converting the image data held in the receiving buffer into pixel data, one line at a time (step 302).

Figure 18:
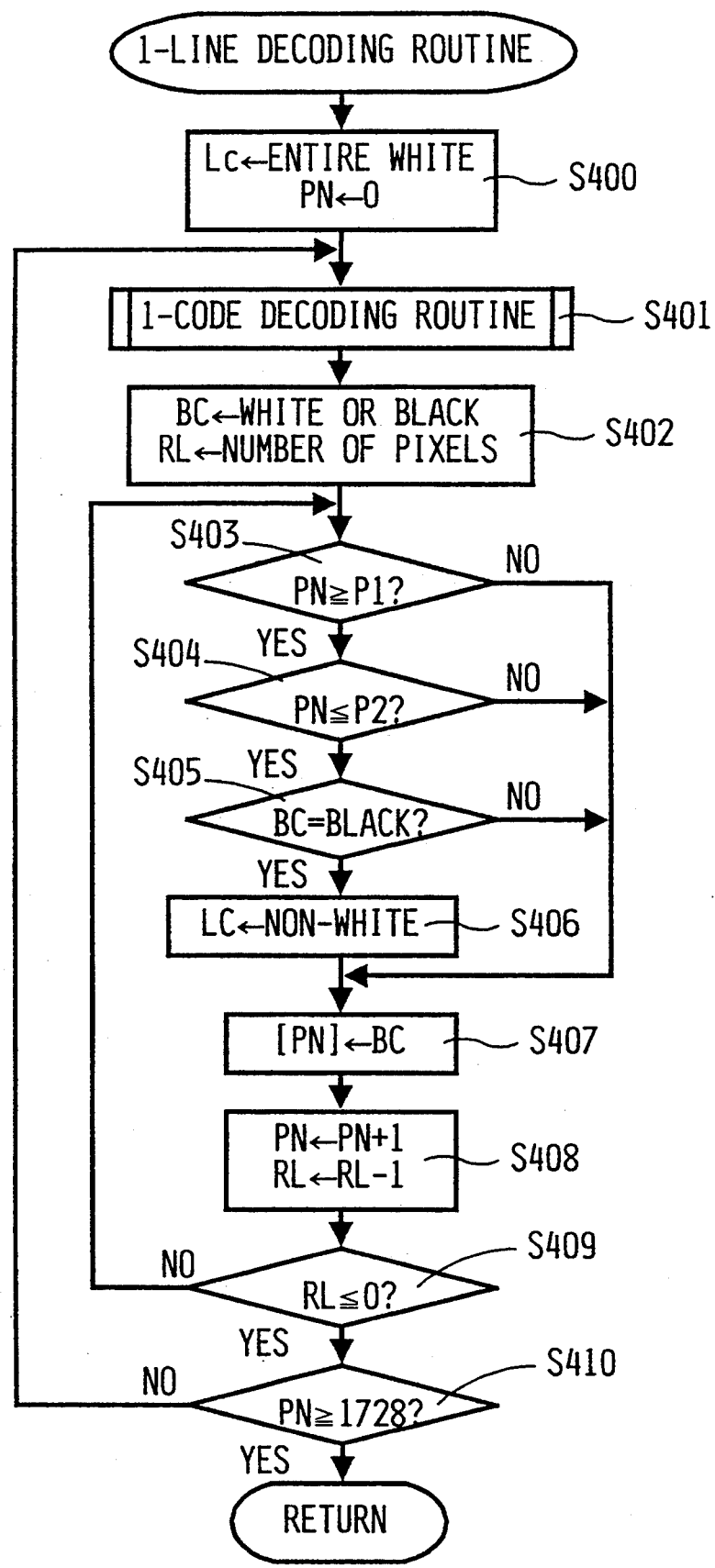
FIG. 18 is a flowchart showing the decoding process for one-line image information based on the facsimile unit in the second embodiment according to the invention.

The decoding process for one-line image data will be explained in detail with reference to FIGS. 11 and 18. The one-line image information sent from the sending unit 9B includes 1728 pixels, and the effective print range in the primary scanning direction on the print paper 18 is defined by the pointers P1 and P2 as shown in FIG. 11. Received image information consists of a set of codes each representing a string of the different number of white and black pixels derived from a white/black dot pattern of the text read by the sending unit 9B.

The CPU 2A initially sets "entire white" for the color information flag LC for one-line image data and sets "0" for the bit pointer PN in the RAM 2C (step 400). It decodes one code out of the received image data (step 401), and sets a pixel color ("white" or "black") to the BC register and the number of pixels to the RL register depending on the decoding result (step 402).

Next, the CPU 2A determines whether the bit pointer PN is within the effective print range between the pointers P1 and P2 (steps 403, 404). If the value PN is within the P1–P2 range (step 403: yes and step 404: yes), the CPU 2A determines whether the pixel color BC is black (step 405). If the pixel color is black (step 405: yes), the CPU 2A sets "black" for the color information flag LC (step 406) and proceeds to step 407. Otherwise, if the bit pointer PN is not within the P1–P2 range (step 403: no or step 404: no), or if the pixel color BC is not "black" (step 405: no) even if PN is within the P1-P2 range, the CPU 2A skips the step 406 and proceeds to step 407.

The CPU 2A sets the pixel color BC to the address "PN" indicated by the bit pointer PN (step 407), and thereafter increments the bit pointer PN by one and decrements the number of pixels RL by one (step 408). The CPU 2A judges whether the number of pixels RL goes negative which is indicative of the completion of the decoding process for one code of the received image data (step 409). At the beginning, the number of pixels RL is not yet zero (step 409: no), and the CPU 2A returns to step 403 to repeat the operation of steps 403–409 until the number of pixels RL reaches zero when the decoding process for one code finishes (step 409: yes). The CPU 2A judges whether the bit pointer PN exceeds 1728 indicative of the completion of decoding process for one line of the received image data (step 410). If it is not yet finished (step 410: no), the CPU 2A repeats the steps 403–410 until the decoding process for one complete line of received image data finishes (step 410: yes). The CPU 2A goes out of the one-line decoding routine and returns to step 303 of the main print routine of FIG. 17.

Following the formation of print data of one complete line through the above-mentioned decoding process (step 302), the CPU 2A increments the reception line counter R by one (step 303). Subsequently, it determines whether the color information LC of the decoded line is entirely white (step 304). If the color information LC is entirely white (step 304: yes), the CPU 2A increments the consecutive white line counter W by one (step 305), or if the color information LC is not entirely white (step 304: no), it clears the consecutive white line counter W (step 306).

Subsequently, the CPU 2A determines whether a flag F that is set in step 313 (explained shortly) is "1" (step 307). The flag F is initially "0" (step 307: no), and the CPU 2A judges whether the reception line count value R has reached a first prescribed value Ra that corresponds to the length of print paper 18 in the secondary scanning direction (step 310). If the value R has not yet reached the value Ra (step 310: no), the CPU 2A judges whether the decoding process for one complete page of received image data has finished based on the presence or absence of the RTC code indicative of "page end" in the one-line print data (step 314). The RTC code is not yet detected (step 314: no), and the CPU 2A repeats the steps 302–314.

After that, when the CPU 2A detects the equality of the reception line count value R to the value Ra (step 310: yes), it implements the divisional print operation for printing print data from the first line to the Ra-th line on the first page of print paper 18 (step 311). Thereafter, the CPU 2A clears the reception line counter R and consecutive white line counter W, and sets "1" to the flag F (step 313).

The CPU 2A judges whether the decoding process for one complete page of the print data has finished (step 314). If one-page print data has been decoded (step 314: yes), the CPU 2A judges whether the reception line count value R is equal to the consecutive white line count value W (step 315). These values R and W are not equal in this case (step 315: no) and, if there is residual data among the one-page print data, the CPU 2A implements the print operation for it before terminating the print control.

In case the decoding process for one-page print data is not yet finished (step 314: no), the CPU 2A repeats the steps 302–314. The flag F is set to "1" in this case (step 307: yes) and the CPU 2A judges whether the reception line count value R is equal to Rc−Ra (step 308). In case the number of lines on a text page is smaller than the second prescribed value Rc, the reception line count value R will reach the maximum value (final value) during the repetitive operation of the steps 302–314 by the CPU 2A. On this account, the CPU 2A makes a judgement of the completion of the decoding process for one page of print data (step 314: yes).

In the case where all lines following the Ra-th line are white lines, the values R and W are equal (step 315: yes), and the CPU 2A terminates the print control. Accordingly, a second page of print paper 18 without any print is not delivered in this case, and the print paper 18 and inked ribbon 40 can be saved.

Figure 16:
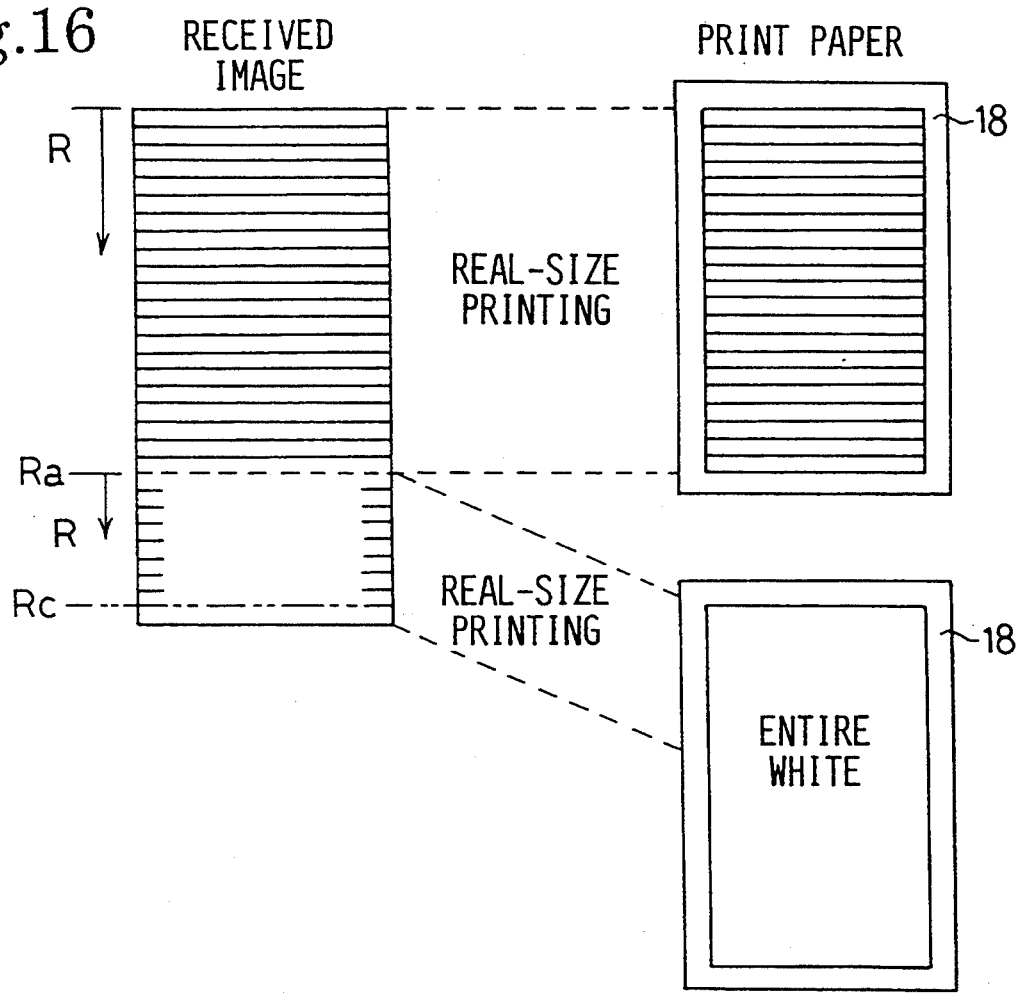
FIG. 16 is a diagram showing received image information and a real-size print of the image information based on the facsimile unit in the second embodiment according to the invention.

In case the number of lines on a text page is larger than the second prescribed value Rc as shown in FIG. 16, the reception line count value R will be equal to Rc−Ra during the repetitive operation of the steps 302–314 by the CPU 2A (step 308: yes). In this case, the CPU 2A implements the print commencement for the print data portion following the Ra-th line (step 309: yes). Accordingly, regardless of the lines from the Ra-th to Rc-th lines being white lines or not, printing on the print paper 18 starts after the print skipping up to the Rc-th line, and consequently the occurrence of reception error due to the overflow of the receiving buffer can be prevented.

After that, when the CPU 2A detects the inequality of the values R and Ra (step 310: no), it repeats the operation of steps 302–314. On completion of the decoding process for one page of print data (step 314: yes), the CPU 2A judges whether the reception line count value R is equal to the consecutive white line count value W (step 315). If these values R and W are equal, i.e., if the (Ra+1)th through Rc-th lines are all white lines, (step 315: yes), it is not necessary to continue the printing that has commenced at step 309, and the CPU 2A terminates the print control. In this case, the print operation on the second page of paper 18 (nothing has been printed actually) is suspended, and a sheet of blank paper is delivered. Consequently, the inked ribbon 40 can be saved.

Otherwise, if the values R and W are not equal (step 315: no), i.e., it connotes that a non-white line data is included in the (Ra+1)th through Rc-th lines, the CPU 2A implements the print operation for the residual data of print data of these lines (step 316) before terminating the print control.

The effectiveness of the print control performed by the foregoing facsimile units is as follows.

In case, as shown in FIG. 15, the number of lines of received one-page image information is larger than the first prescribed value Ra and smaller than the second prescribed value Rc, and if lines following the Ra-th line are all white lines, lines up to the Ra-th line are printed on the first page of print paper 18, but printing on the second page of paper is not carried out. Consequently, the print paper 18 and inked ribbon 40 are not consumed unnecessarily.

In case the number of lines of received one-page image information is larger than or equal to the second prescribed value Rc, the print operation of the second page is commenced for lines following the Ra-th line at the time when the line count has reached the value Rc so as to promote the output of image information from the receiving buffer. Consequently, the occurrence of reception error due to the overflow of receiving buffer that is caused by the continuous holding of printing on the second page of print paper can surely be prevented. In addition, if lines following the Ra-th line are all white lines, the print operation is suspended immediately, and the inked ribbon 40 can be saved.

Figure 19:
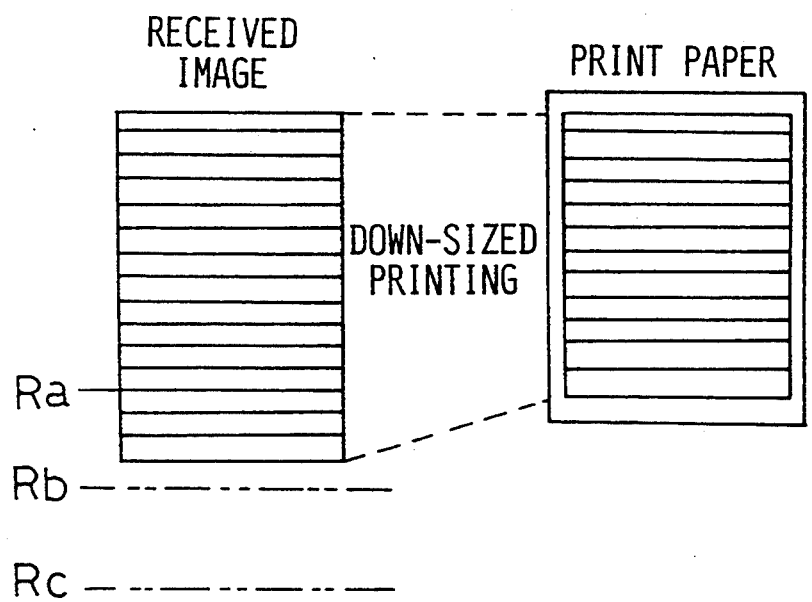
FIG. 19 is a diagram showing received image information and a down-sized print of the image information based on the facsimile unit in the second embodiment according to the invention.

As a modified embodiment, a third prescribed value Rb may be set between the first value Ra and second value Rc as shown in FIG. 19, with the first through Rb-th lines being printed in reduced-size on a sheet of print paper 18, so that when the number of lines of received one-page image information is larger than the first prescribed value Ra and smaller than the third prescribed value Rb and if a non-white line data is included in lines following the Ra-th line, the receive image information is printed in reduced-size on a sheet of print paper 18.

What is claimed is:

1. A facsimile apparatus having means for printing received image information on a sheet of print paper, said apparatus comprising:

white line discrimination means that examines each line of received image information and determines the line to be a white line if image information of the line included within a predetermined print range in the primary scanning direction of said printing means consists of only white pixel information;

comparison means for comparing the page length in the secondary scanning direction of the received image information with a prescribed length; and control means that controls the print operation, in a case where the result of a comparison of said comparison means reveals that the page length of the received image information is longer than the prescribed length and, at the same time, if the result of a judgement of said white line discrimination means reveals that the excessive portion of the one-page image information is only white line data, to print the received image information exclusive of the excessive portion as one-page image information on a sheet of print paper.

2. The facsimile apparatus according to claim 1, wherein said control means controls the print operation, in a case where the result of the comparison of said comparison means reveals that the page length of the received image information is longer than the prescribed length and, at the same time, if the result of the judgement of said white line discrimination means reveals that the excessive portion of the one-page image information is only white line data, to print the received image information exclusive of the excessive portion in real-size on a sheet of print paper, or controls the print operation, in a case where the result of the comparison of said comparison means reveals that the page length of the received image information is longer than the prescribed length and, at the same time, if the result of the judgement of said white line discrimination means reveals that the excessive portion of the one-page image information is not only white line data, to print the received image information by size reduction on a sheet of print paper or by page division on sheets of print paper.

3. A facsimile apparatus having means of reading image information on a text and means of transmitting the image information read by said reading means, said apparatus comprising:

white line discrimination means that examines each line of image information read by said reading means and determines the line to be a white line if image information of the line included within a predetermined print range in the primary scanning direction of a receiving apparatus consists of only white pixel information;

comparison means for comparing the page length in the secondary scanning direction of the readout image information with a prescribed length; and control means that controls the print operation, in case where the result of comparison of said comparison means reveals that the page length of the readout image information is longer than the prescribed length and, at the same time, if the result of a judgement of said white line discrimination means reveals that the excessive portion of the one-page image information is only white line data, to print the readout image information exclusive of the excessive portion as one-page image information on a sheet of print paper.

4. A facsimile apparatus having means for printing received image information on a sheet of print paper, said apparatus comprising:

white line discrimination means that examines each line of received image information and determines the line to be a white line if image information of the line included within a predetermined print range in the primary scanning direction of said printing means consists of only white pixels;

count means for counting the number of lines in the secondary scanning direction of the received one-page image information; and control means that operates on said printing means, in response to the arrival of the count value of said count means at a first prescribed value that corresponds to the page length in the secondary scanning direction of print paper, to print the received image information up to the line of the first prescribed value, and operates on said printing means, in a case where the final value of the count value is larger than the first prescribed value and smaller than a second prescribed value and, at the same time, if the result of a judgement of said white line discrimination means reveals that lines in excess of the first prescribed value are only white line data, to have no print operation for the excessive portion.

5. The facsimile apparatus according to claim 4, wherein said control means operates on said printing means to commence printing for lines in excess of the first prescribed value in response to the arrival of the count value of said count means at the second prescribed value.

6. A facsimile apparatus having means for printing received image information on a sheet of print paper, said apparatus comprising:

white line discrimination means that examines each line of received image information and determines the line to be a white line if image information of the line included within a predetermined print range in the primary scanning direction of said printing means consists of only white pixels;

comparison means for comparing the page length in the secondary scanning direction of the received image information with a first prescribed length and a second prescribed length; and control means that controls the print operation, in a case where the result of comparison of said comparison means reveals that the page length of the received image information is longer than the first prescribed length and shorter than the second prescribed length and, at the same time, if the result of a judgement of said white line discrimination means reveals that the excessive portion of the image information in excess of the first prescribed length is only white line data, to print the received image information exclusive of the excessive portion as one-page image information on a sheet of print paper.

7. The facsimile apparatus according to claim 6, wherein said control means controls the print operation, in a case if the result of the judgement of said white line discrimination means reveals that the excessive portion of the image information includes non-white line data, to print the received image information by size reduction on a sheet of print paper or by page division on sheets of print paper.

8. A facsimile machine for transmitting and receiving image data, said facsimile machine having means for printing received image data on a sheet of paper, comprising:

means for specifying a print range in a primary print direction;

means for determining whether data for a received line contains image data within said print range;

a line counter for counting a number of received lines prior to a end of page designator;

means for comparing the number of received lines to a first predetermined value indicating a number of lines that can be printed at a normal size in a secondary print direction and to a second predetermined value indicating the number of lines that can be printed at a reduced size in the secondary print direction; and means for determining whether any of the received lines, the number of which is greater than or equal the first predetermined value, contain image data within the print range.

9. The facsimile machine as claimed in claim 8, wherein when the lines reserved are greater than or equal to the first predetermined value contain no image data but only white data, the received lines up to the first predetermined value are printed at the normal size and the remaining lines containing white data are deleted.

10. The facsimile machine as claimed in claim 8, wherein when the lines are greater than or equal to the first predetermined value contain image data but a total number of received lines is less than the second predetermined value, the received data is printed on a single sheet of paper at a reduced size.

11. The facsimile machine as claimed in claim 8, wherein when the lines received are greater than or equal to the second predetermined value and contain image data, the lines greater than or equal to the first predetermined value are printed at the normal size on a second sheet of paper.

12. The facsimile machine as claimed in claim 8, wherein when the lines received are greater than or equal to the second predetermined value and the data of the lines that are greater than or equal to the first predetermined value do not contain image data or are white lines, the lines commencing with the first predetermined value are deleted and the received lines less than the first predetermined value are printed in the normal size.

13. The facsimile machine as claimed in claim 8, wherein when the number of received lines is greater than the second predetermined value, and the lines commencing with the first predetermined value are white lines, the received lines less than the first predetermined value are printed at normal size on a sheet of print paper and a second sheet of paper is ejected without printing taking place.

14. The facsimile machine as claimed in claim 8, further comprising:
- means for reading image data from a text sheet;
- means for determining a print range of a receiving facsimile machine;
- means for establishing a transmission range corresponding to the determined print range for a line of image data; and
- means for determining when lines within the print range contain only white data and deleting such lines from the transmitted information when occurring adjacent at end of a page.

* * * * *